United States Patent [19]
Morita et al.

[11] Patent Number: 6,102,318
[45] Date of Patent: Aug. 15, 2000

[54] MAGNETIC TAPE CASSETTE

[75] Inventors: Kiyoo Morita; Katsuki Asano; Kazuo Hiraguchi, all of Kanagawa, Japan

[73] Assignee: Fuji Photo Film Co., Ltd., Kanagawa, Japan

[21] Appl. No.: 09/450,005

[22] Filed: Nov. 29, 1999

Related U.S. Application Data

[62] Division of application No. 09/019,439, Feb. 5, 1998, Pat. No. 6,024,315.

[30] Foreign Application Priority Data

| Feb. 5, 1997 | [JP] | Japan | 9-22789 |
| Feb. 25, 1997 | [JP] | Japan | 9-40965 |
| Mar. 5, 1997 | [JP] | Japan | 9-50492 |
| Apr. 3, 1997 | [JP] | Japan | 9-85201 |

[51] Int. Cl.[7] ............ G11B 23/04; G11B 23/02
[52] U.S. Cl. ............ 242/347.1; 360/132
[58] Field of Search ............ 242/347.1; 360/132

[56] References Cited

U.S. PATENT DOCUMENTS

| 4,680,660 | 7/1987 | Ueda | 360/132 |
| 5,299,755 | 4/1994 | Fujii | |
| 5,407,145 | 4/1995 | Iwahashi | 242/347.1 |

FOREIGN PATENT DOCUMENTS

| 0 078 696 A1 | 5/1983 | European Pat. Off. |
| 0 090 573 A1 | 10/1983 | European Pat. Off. |
| 0 109 682 A2 | 5/1984 | European Pat. Off. |
| 0 129 844 A1 | 1/1985 | European Pat. Off. |
| 0 384 786 A2 | 8/1990 | European Pat. Off. |
| 0 657886 A2 | 6/1995 | European Pat. Off. |
| 0 666 563 A2 | 8/1995 | European Pat. Off. |
| 0 666 564 A2 | 8/1995 | European Pat. Off. |
| 2508223 | 6/1982 | France. |
| 7-220 442 | 8/1995 | Japan. |

*Primary Examiner*—John Q. Nguyen
*Attorney, Agent, or Firm*—Sughrue, Mion, Zinn, Macpeak & Seas, PLLC

[57] ABSTRACT

The magnetic tape cassette (20) wherein a closing lid unit (27) which covers a front side of the cassette main body (24) consists of three lid plates, an outer lid (29), a top lid (30) and an inner lid (31) has a structure wherein top ends of the inner lid guide grooves (35) open wide to an upper surface of the cassette main body (24) so that the inner lid slide pins (31c) of the inner lid (31) can be fitted in the inner lid guide grooves (35) from the upper side of the cassette main body (24). Slits (40a) and (40b) are provided at both ends of the top lid plate (30a) of the top lid (30) so as to facilitate flexibility of the outer lid linking portions (30b) and arm portions (30c) to be bent outward.

3 Claims, 15 Drawing Sheets

MAGNETIC TAPE CASSETTE

This is a divisional of application Ser. No. 09/019,439, filed Feb. 5, 1998, U.S. Pat. No. 6,024,315, the disclosure of which is incorporated herein by reference.

BACKGROUND OF THE INVENTION

The present invention relates to a magnetic tape cassette which is utilized in a magnetic recording and replaying apparatus, such as a video tape recorder, and other various kinds of information processing apparatuses.

In addition, the present invention specifically relates to a type of magnetic tape cassette wherein a closing lid unit which covers an opening at a front part of the cassette main body so as to be opened and closed freely consists of three lids.

Further, the present invention also relates to a magnetic tape cassette which is preferably utilized in such as a video tape cassette, wherein a lid lock spring that applies force to a lid lock which locks a lid that covers and uncovers an opening at a front end of a cassette case and an attaching structure thereof are improved.

With further increase in magnetic recording density in recent years, magnetic tape cassettes and video tape recorders (hereinafter referred to as VTRs) have become more compact. As the result, VTRs are used outdoors more frequently in such a case as videotaping scenery and figures. Therefore, the magnetic tape cassettes also specially consider outdoor use and a closing lid unit which consists of two or three lids for covering the front and rear sides of the tape has been utilized as a dust-preventive countermeasure.

FIGS. 1 through 3 show a conventional magnetic tape cassette wherein three lids constitute a closing lid unit for covering an opening at a front part of a cassette main body so as to be opened and closed freely.

This magnetic tape cassette 1 comprises a cassette main body 4 which comprises an opening 2 at a front part for insertion of a tape picking element on the side of such an apparatus as a VTR, a magnetic tape 5 which is suspended over the opening by a tape guide provided at the front part of such cassette 4 and a closing lid unit 7 which is attached to a front side of the cassette main body 4 so that the magnetic tape 5 suspended over the opening 2 will be covered for such an occasion as portable use.

The cassette main body 4 consists of an upper cassette half 4a and a lower cassette half 4b. The closing lid unit 7 consists of three lids, an outer lid (front lid) 9, a top lid (upper lid) 10 and an inner lid (rear lid) 11.

The outer lid 9 comprises an outer lid plate 9a which covers a front side of the magnetic tape 5 suspended over the opening 2 and side plate portions 9b which extend from both sides of this outer lid plate 9a. Supporting axle-pins 9c are provided so as to protrude from the inner wall surfaces of the side plate portions 9b, and such supporting axle-pins 9c are fitted in and supported by pin holding holes on both lateral side portions of the upper cassette half 4a at positions close to the front thereof so as to revolve freely. Therefore, the outer lid 9 revolves freely with the supporting axle-pins 9c as revolving centers.

The top lid 10 comprises a top lid plate 10a which covers an area above the magnetic tape 5 which is suspended over the opening 2, outer lid linking portions 10a that link both ends of this top lid plate 10a at the front edge side thereof to a top edge of the, outer lid plate 9a so as to revolve freely and top lid slide pins 10d that protrude from arm portions 10c which extend from the rear end edge of the top lid plate 10a and that engage with top lid guide grooves 13 which are formed on both the lateral side portions of the upper cassette half 4a so as to slide freely.

As shown in FIG. 3, when the outer lid 9 is opened, this top lid 10 moves to the rear end side of the cassette main body 4 to be approximately parallel to the upper surface of the cassette main body 4 while the top lid slide pins 10d move along the top lid guide grooves 13 according to a revolutionary transfer movement around the supporting axle-pins 9c of the outer lid linking portions 10b. The outer lid linking portions 10b are pins-which fit in engagement holes 9d (not shown) that are provided in both top edge end portions of the outer lid plate 9a.

The inner lid 11, which comprises an inner lid plate 11a that covers a rear side of the magnetic tape 5 which is suspended over the opening 2, top lid linking portions 11b that link a top edge of this inner lid plate 11a to the top lid plate 10a so as to revolve freely and inner lid slide pins 11c that protrude from both ends of a bottom edge of the inner lid plate 11a and that engage with inner lid guide grooves 15 which are formed on inner lateral side portions of the cassette main body 4 so as to slide freely. In this embodiment, as shown in FIG. 2, the top lid linking portions 11b are pins which fit in supporting holes 10f (not shown) that are provided in supporting pieces 10e which protrude from the top lid plate 10a.

To describe the inner lid 11, when the outer lid 9 is opened, while the top lid linking portions 11b follow the movement of the top lid 10, the inner lid slide pins 11c move along the inner lid guide grooves 15 according to a transfer movement of such top lid linking portions 11b. As shown in FIG. 3, the inner lid 11 follows the opening action of the top lid 10 and retreats to the area above the opening 2.

When the magnetic tape cassette 1, such as described above, is mounted on a VTR apparatus, the side plate portions 9b of the outer lid 9 are pushed upward by a lid opening pin (not shown) which is provided on the apparatus side and, corresponding to the opening action of the outer lid 9, the top lid 10 and the inner lid 11 are opened. When the magnetic tape cassette 1 is removed from the VTR apparatus, the lids are closed in a manner reverse to that of mounting.

To assemble such magnetic tape cassette 1 as having a three-plate closing lid unit 7, the outer lid 9, the top lid 10 and the inner lid 11 are assembled temporarily in advance and then, while the top lid slide pins 10d of the top lid 10 are being fitted in the top lid guide grooves 13 which has been provided in the upper cassette half 4a, the three lids 9, 10 and 11 are attached to the upper cassette half 4a to be followed by attaching of the upper cassette half 4a and the lower cassette-half 4b.

In the assembling procedures as above, however, the lower cassette half 4b which houses a large number of components and the upper cassette half are attached last, such operations as positioning of the large number of components housed in the lower cassette half 4b must be carried out at the same time as the operation to fit the inner lid slide pins 11c into the inner lid guide grooves 15 of the lower cassette half 4b; the assembling operation is thus an elaborate process and has obstructed increase in the productivity. This is a first problem in the prior art.

In the above-described magnetic tape cassette 10, a motion locus of the top lid 10 is defined by the top lid guide grooves 1300 and, between the sliding surfaces 13a and 13b of such top lid guide grooves 13 and the top lid slide pins 10d of the top lid 10, frictional force that work as a sliding resistance is generated.

Some dimensions and configurations of these sliding surfaces 13a and 13b and the top lid slide pins 10d may hinder the top lid slide pins 10d from sliding smoothly when the outer lid 9 is opened and closed, resulting with difficulty in opening of the closing lid unit 7. For example, a force of pressure angle θ, which is a force working in a specific direction, acts from the outer lid linking part 10b via such top lid slide pin 10d against the sliding surface 13a that the top lid sliding pin 10d is in sliding contact with and, if such pressure angle θ is larger than a certain range of values, the smooth sliding of the top lid slide pin 10d is hindered to result with difficulty in opening of the closing lid unit 7. This is a second problem in the prior art.

There have been a variety of magnetic tape cassettes such as a video tape cassette. Among these magnetic tape cassette is a video tape cassette which is, as the disassembled structure thereof is shown in FIG. 4, of a comparatively small size and utilized for such as DVC.

In this video tape cassette 6, a pair of reel hubs 62 and 63 are disposed inside a lower half 61 so as to revolve, and a magnetic tape (not shown in the figure) is wound around these reel hubs 62 and 63. The magnetic tape, which is guided by tape guides 65 and 66 at positions close to the front of the cassette (left side in FIG. 4) and on both right and left sides, passes an opening 67 on the front side of the lower half 61.

On the rims of the reel hubs 62 and 63 (lower flange rims), teeth 70 and 71 are formed along the entire circumference.

In a space which is formed on a rear part of the cassette and between the reel hubs 62 and 63, a sliding element 72 which constitutes a lock device for locking of revolutions of the reel hubs 62 and 63, reel brakes which are engagement claws and a brake spring 74 for applying a force to the reel brakes are disposed to prevent the magnetic tape from slacking when the video tape cassette 6 is not mounted on a video deck (not shown in the figure) or when the cassette is stored or being carried.

An outer lid 76, an upper lid 77 and an inner lid 78 which constitute the lid unit that covers the opening at the front of the cassette case are attached to the upper half 75 so as to be opened and closed freely.

A lock pin 80 protruded from a lateral side plate 79 of the outer lid 76. A lid lock 82 which locks a lock pin 80 of the outer lid 76 is attached to a lateral side plate part 81 of the lower half 61 so as to revolve freely, and a leaf spring 83 is also attached as a lid lock spring which applies a force to the lid lock 82 toward lock side.

A reference numeral 85 defines an upper flange of the reel hub, and a reference numeral 86 indicates a lid spring 86 attached to a revolving shaft of the outer lid 76. In the figure, no symbols are given to the components beside the principle portions, and the descriptions are also omitted.

The above-described leaf spring 83, as FIG. 5 (a view at a position along section A—A in the direction of the arrows in FIG. 4) shows a magnified view thereof, is appropriately bent so as to have a lateral-side-view configuration including a part 83b that is extended so as to depress the lid lock 82 and a curved part that is extended so as to engage with the lower half.

The curved part 83a of the leaf spring 83, which is extended comparatively largely to a side opposite to the part which depresses the lid lock 82, is inserted by elastic deformation between a rib 88 which protrudes from a bottom wall or lateral side wall of the lower half 61 and a part 87 of a lateral side wall that confronts such rib. Availability of this engagement state enables temporary fastening of the leaf spring 83 before being covered with the upper half 75.

In the conventional video tape cassette 6, however, since the leaf spring 83 has such a structure as to be bridged between the rib 88 and the part 87 of the lateral side wall, an attachment base part which is larger than a part which actually functions as a spring has increased the entire size and consequently caused increase in the cost.

Additionally, the rib 88 has to be formed in the lower half for the attachment of the leaf spring 83. Formation of such rib 88 tends to facilitate generation of shrink marks in the vicinity of the rib 88 when the lower half is molded. This comparatively tends to result with degradation in the molding accuracy of the lower half.

On the other hand, it is comparatively difficult to improve the forming accuracy of the leaf spring 83 which is an elastic component.

As discussed above, the unstable forming accuracy of the leaf spring 83, as well as the degradation of the molding performance of the part such leaf spring is attached to, has aroused a problem of unfavorable efficiency of assembling since the leaf spring 83 is comparatively difficult to be locked securely at the time of attachment. Especially when such as an automatic assembling apparatus is utilized, the conventional leaf spring 83 has aroused a problem of difficulty in automatic assembling. This is a third problem in the prior art.

SUMMARY OF THE INVENTION

A first object of the present invention is to solve the problems discussed above, particularly the first problem, and to provide a magnetic tape cassette wherein a closing lid unit which covers an opening at a front part of the cassette main body so as to be opened and closed freely consists of three lids and wherein the assembling operation is facilitated to achieve higher productivity.

In addition, a second object of the present invention is to solve the problem discussed above, particularly the second problem, and to provide a favorable magnetic tape cassette wherein a closing lid unit can be opened and closed smoothly.

Further, a third object of the present invention is to solve the above-mentioned problem, particularly the third problem as described above, and to provide a magnetic tape cassette which enables cost reduction with an economical structure of the lid lock spring and which facilitates automation of the assembling.

The first object of the present invention discussed above is achieved by a magnetic tape cassette, according to a first aspect of the present invention, including, a cassette main body having an opening at its front part, top lid guide grooves formed on both its lateral side portions of the cassette main body, and inner lid guide grooves formed on its inner lateral side portions of the cassette main body, a pair of reels disposed inside the cassette main body and attached so as to be rotatable with a magnetic tape wound therearound, and a lid unit for covering the opening, wherein the lid unit comprises:

an outer lid including an outer lid plate that covers a front side of the magnetic tape that is suspended over the opening, side plate portions extending from both sides of the front lid plate and being rotatably supported by both lateral side portions of the cassette main body, and pins protruded from the inner wall surfaces of the side plate portions and rotatably fitted on both lateral side portions of the cassette main body in such a manner that the outer lid is rotatable with respect to the cassette main body about the pins;

a top lid including a top lid plate covering an area above the magnetic tape which is suspended over the opening, the top lid plate being provided with arm portions which extended from both ends of the top lid plate, outer lid linking portions rotatably engaging both ends of the top lid plate at the front edge side thereof to a top edge of the outer lid plate, and top lid slide pins protruded from the arm portions and engaged with the top lid guide grooves of the cassette main body so as to be slidable relative to the cassette main body; and an inner lid including, an inner lid plate covering a rear side of the magnetic tape which is suspended over the opening, top lid linking portions engaging a top edge of the inner lid plate with the top lid plate so as to be rotatable each other, and inner lid slide pins protruded from both ends of a bottom edge of the inner lid plate and engaged with the inner lid guide grooves so as to be slidable relative to the cassette main body;

wherein top ends of the inner lid guide grooves are opened to an upper surface of the cassette main body so as to insert the inner lid slide pins of the inner lid into the inner lid guide grooves from the upper side of the cassette main body, and a slit member is provided at at least one of the end side of the top lid plate of the top lid so as to facilitate flexibility of a portion of the top lid plate to be bent outwardly when magnetic tape cassette is assembled.

In the above-mentioned magnetic tape cassette, the slit member preferably comprises at least one of a first slit which is provided at the end side of the top lid plate of the top lid so as to facilitate flexibility of the arm portions and a second slit which is provided at the end side of the top lid plate of the top lid so as to facilitate flexibility of the outer lid linking portions.

Further, in the above-mentioned magnetic tape cassette, the slit member more preferably comprises both of the first slit and the second slit.

In the structure described above, the top ends of the inner lid guide grooves open wide to the upper surface of the cassette main body so that the inner lid slide pins of the inner lid can be fitted in the inner lid guide grooves on the cassette main body side even after assembly of the outer lid to the cassette main body. The provision of slits in not less than one end side of the top lid plate of the top lid so as to facilitate flexibility of the outer lid linking portions and arm portions to be bent outward enables the top lid linking portions to be fitted in the specific positions of the outer lid and also enables the top lid slide pins which protrude from the arm portions to ride over the square edge portions of the top edge and to be fitted in the specific top lid guide grooves even after assembly of the cassette main body and the outer lid, if the outer lid linking portions and arm portions are pushed inward by utilization of the slits for outward elastic displacement while the top lid is approximately aligned to the attaching positions from the upper surface side of the cassette main body.

Therefore, the magnetic tape cassette according to the present invention enables attachment of the inner lid and the. top lid after completion of the assembly of the outer lid to the upper and lower cassette halves which constitute the cassette main body. Consequently, the above-described processes of fitting the slide pins of each lid into the guide grooves need not to be carried out at the same time as such operations as positioning of the large number of components housed in the lower cassette half.

In addition, the first object of the present invention discussed above is also achieved by a magnetic tape cassette, according to a second aspect of the present invention, that comprises:

a cassette main body having an opening at its front part, top lid guide grooves formed on both its lateral side portions of the cassette main body, and inner lid guide grooves formed on its inner lateral side portions of the cassette main body, a pair of reels disposed inside the cassette main body and attached so as to be-rotatable with a magnetic tape wound therearound, and a lid unit for covering the opening, wherein the lid unit comprises:

an outer lid including an outer lid plate that covers a front side of the magnetic tape that is suspended over the opening, side plate portions extending from both sides of the front lid plate and being rotatably supported by both lateral side portions of the cassette main body, and pins protruded from the inner wall surfaces of the side plate portions and rotatably fitted on both lateral side portions of the cassette main body in such a manner that the outer lid is rotatable with respect to the cassette main body about the pins;

a top lid including a top lid plate covering an area above the magnetic tape which is suspended over the opening, the top lid plate being provided with arm portions which extended from both ends of the top lid plate, outer lid linking portions rotatably engaging both ends of the top lid plate at the front edge side thereof to a top edge of the outer lid plate, and top lid slide pins protruded from the arm portions and engaged with the top lid guide grooves of the cassette main body so as to be slidable relative to the cassette main body; and an inner lid including, an inner lid plate covering a rear side of the magnetic tape which is Suspended over the opening, top lid linking portions engaging a top edge of the inner lid plate with the top lid plate so as to be rotatable each other, and inner lid slide pins protruded from both ends of a bottom edge of the inner lid plate and engaged with the inner lid guide grooves so as to be slidable relative to the cassette main body;

wherein top ends of the inner lid guide grooves are opened to an upper surface of the cassette main body so as to insert the inner lid slide pins of the inner lid into the inner lid guide grooves from the upper side of the cassette main body, and a chamfering member is provided for facilitating an assembling operation between the top lid slide pin and the top lid guide groove of the cassette main body.

In the above-mentioned magnetic tape cassette, the chamfering member preferably comprises at least one of a first chamfering portion formed at edge portion of lateral side top edges of the cassette main body and disposed over the top lid guide groove, and a second chamfering portion formed at tip of the top lid slide pin.

In addition, in the above-mentioned magnetic tape cassette, the chamfering member more preferably comprises both of the first chamfering portion and the second chamfering portion.

In the structure described above, the top ends of the inner lid guide grooves open wide to the upper surface of the cassette main body so that the inner lid slide pins of the inner lid can be fitted in the inner lid guide grooves on the cassette main body side even after assembly of the outer lid to the cassette main body. The provision of chamfering at edge portions of lateral side top edges of the cassette main body, which are disposed over the top lid guide grooves, and at tips of the top lid slide pins enables the chamfered portions to be pressed onto each other and thus an action of outward elastic displacement of the top lid slide pins is generated by a reaction force of pressing, which acts mutually between the chamfered surfaces, even after assembly of the cassette main body and the outer lid, if the outer lid slide pins of the top lid are pushed from the upper side of the cassette main body onto the edge portions of lateral side top edges of the cassette main body, which are disposed over the top lid guide grooves. Therefore, the top lid slide pins are enabled to ride over the edge portions of the top edges of the cassette main body and to be fitted in the top lid guide grooves.

Therefore, the magnetic tape cassette according to the present invention enables attachment of the inner lid and the top lid after completion of the assembly of the outer lid to the upper and lower cassette halves which constitute the cassette main body. Consequently, the above-described processes of fitting the slide pins of each lid into the guide grooves need not to be carried out at the same time as such operations as positioning of the large number of components housed in the lower cassette half.

The second object of the present invention discussed above is achieved by a magnetic tape cassette, according to a third aspect of the present invention, that comprises a cassette main body having an opening at its front part, top lid guide grooves formed on both its lateral side portions of the cassette main body, and inner lid guide grooves formed on its inner lateral side portions of the cassette main body, a pair of reels disposed inside the cassette main body and attached so as to be rotatable with a magnetic tape wound therearound, and a lid unit for covering the opening, wherein the lid unit comprises:

an outer lid including an outer lid plate that covers a front side of the magnetic tape that is suspended over the opening, side plate portions extending from both sides of the front lid plate and being rotatably supported by both lateral side portions of the cassette main body, and pins protruded from the inner wall surfaces of the side plate portions and rotatably fitted on both lateral side portions of the cassette main body in such a manner that the outer lid is rotatable with respect to the cassette main body about the pins;

a top lid including a top lid plate covering an area above the magnetic tape which is suspended over the opening, the top lid plate being provided with arm portions which extended from both ends of the top lid plate, outer lid linking portions rotatably engaging both ends of the top lid plate at the front edge side thereof to a top edge of the outer lid plate, and top lid slide pins protruded from the arm portions and engaged with the top lid guide grooves of the cassette main body so as to be slidable relative to the cassette main body; and an inner lid including, an inner lid plate covering a rear side of the magnetic tape which is suspended over the. opening, top lid linking portions engaging a top edge of the inner lid plate with the top lid plate so as to be rotatable each other, and inner lid slide pins protruded from both ends of a bottom edge of the inner lid plate and engaged with the inner lid guide grooves so as to be slidable relative to the cassette main body;

wherein at least a portion of the top lid slide pin of the top lid that is brought in sliding contact with the sliding surface of the top lid guide grooves have a sectional configuration which is formed by a curved line which has a normal that is tilted forward in the direction of the movement of the top lid slide pin as compared with a normal of the sliding surface at the contact points.

In the above-mentioned magnetic tape cassette, the pin preferably has an oval section having the curved line.

The third object of the present invention discussed above is achieved by a magnetic tape cassette, according to a fourth aspect of the present invention that comprises a cassette main body having an opening at its front part;

a pair of reels disposed inside the cassette main body and attached so as to be rotatable with a magnetic tape wound therearound;

a lid unit for covering the opening;

a lid lock for locking the lid unit; and a lid lock spring urging the lid lock toward a position where the lid unit is locked by the lid lock, wherein the lid lock spring is mounted on a portion of the cassette main body through a clamping part which is formed at a basal end portion of the lid lock spring and press-fitted on the portion.

In the above-mentioned magnetic tape cassette, the lid lock spring preferably comprises a leaf spring.

It is favorable that the leaf spring of an embodiment has a structure wherein a part on a side of free end thereof and a part on a side opposite to such free end side hold a part of the lateral side wall.

It is also favorable to have a structure wherein an opening is formed at the attachment base part of the leaf spring while a projection is provided on an edge surface of the lateral side wall so that the projection can be pressed into the opening.

It is also favorable to have a structure wherein a slit is provided at the attachment base part of the leaf spring while a groove of a width which is narrower than that of the attachment base part is provided on an edge surface of a part of the lateral side wall so that the attachment base part can be elastically deformed and pressed into the groove.

The nature, utility and principle of the invention will be more clearly understood from the following detailed description and the appended claims when read in conjunction with the accompanying drawings.

DETAILED DESCRIPTION OF THE PREFERRED EMBODIMENTS

A first embodiment according to the present invention will now be described with references to the attached drawings.

Figure 6:
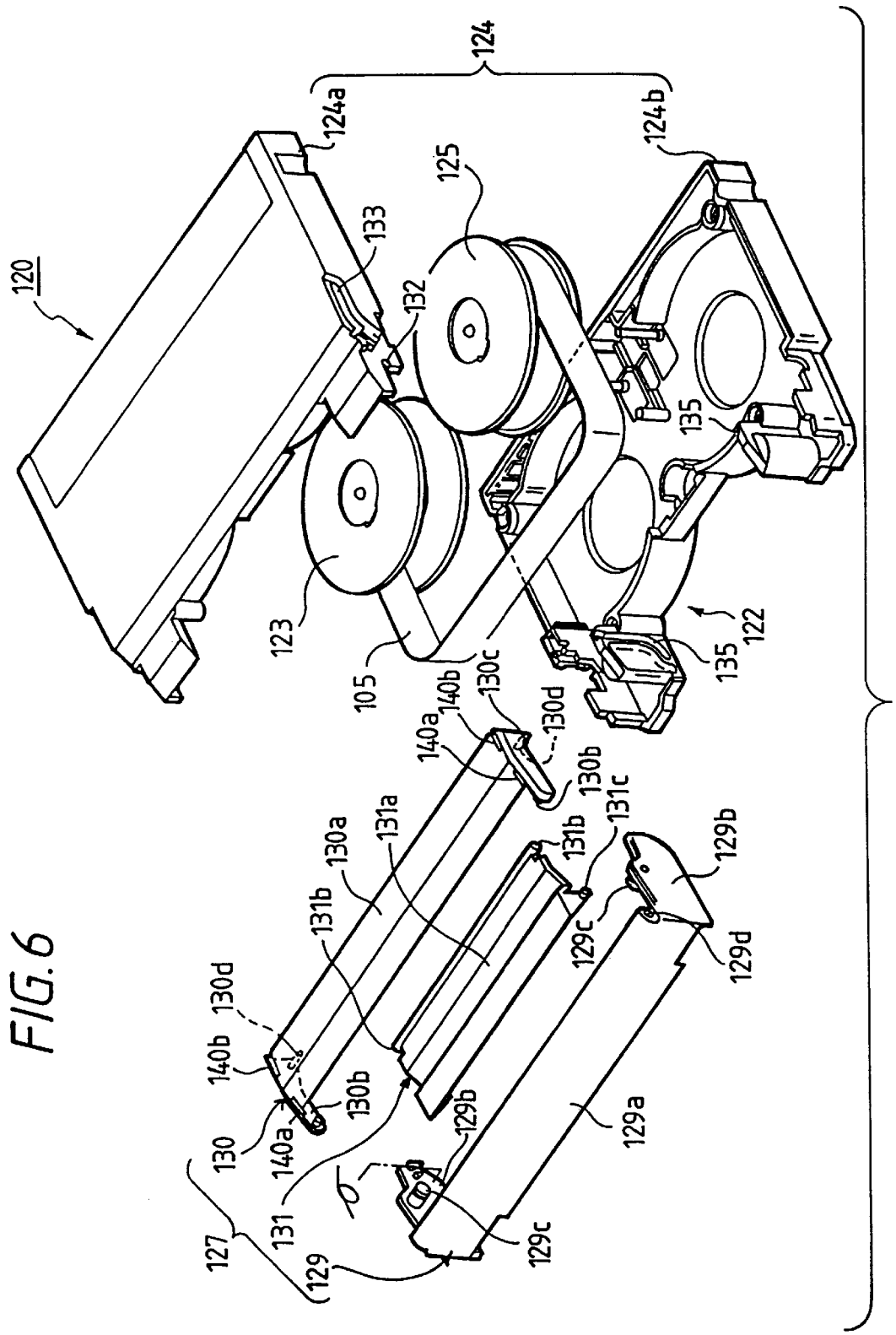
FIG. 6 is a disassembled perspective drawing showing relations between a closing lid unit and a cassette main body of the magnetic tape cassette related to a first embodiment of the present invention.
Figure 7:
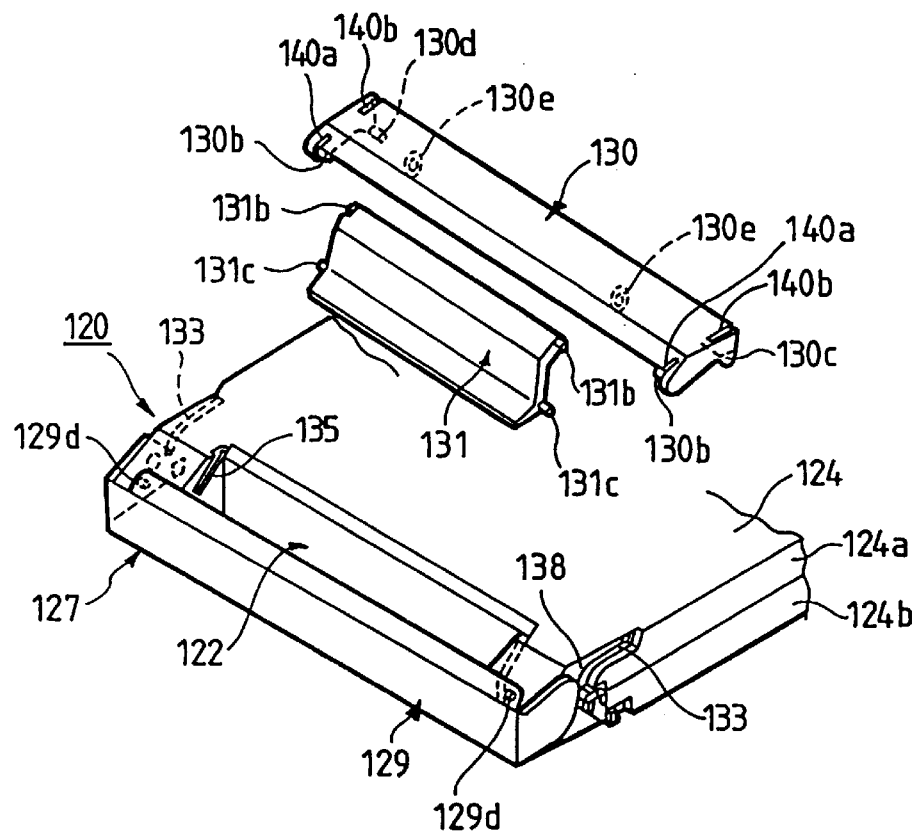
FIG. 7 is a perspective drawing of principle portions showing the assembling procedures of a closing lid unit of the magnetic tape cassette in FIG. 6.
Figure 8:
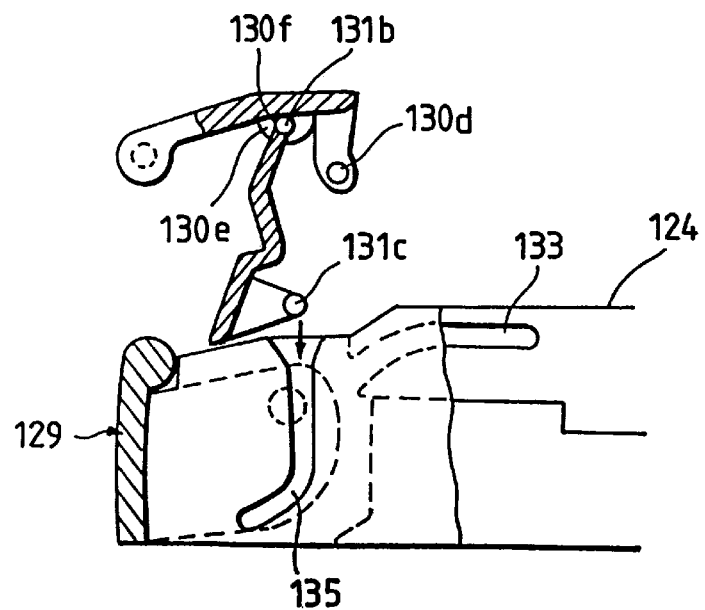
FIG. 8 is a sectional drawing of the principle portions showing an attaching operation of an inner lid of the magnetic tape cassette in FIG. 6.
Figure 9:
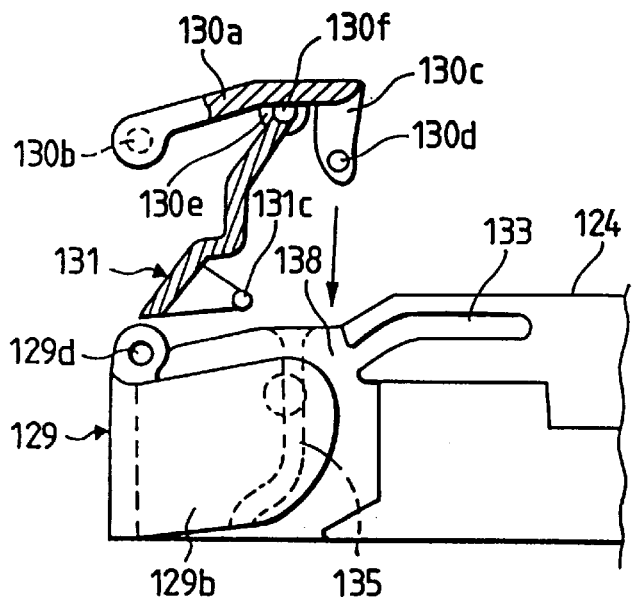
FIG. 9 is a sectional drawing of the principle portions showing an attaching operation of a top lid of the magnetic tape cassette in FIG. 6.
Figure 10:
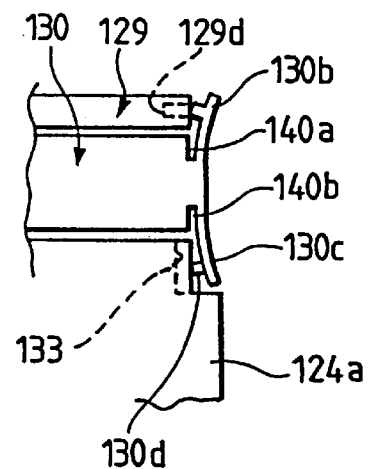
FIG. 10 is a sectional drawing of the principle portions showing an action of an engagement part during attaching operation of the top lid of the magnetic tape cassette in FIG. 6.
Figure 11:
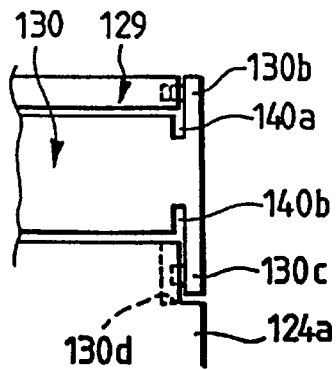
FIG. 11 is a plan of the principle portions showing a state of the top lid of the magnetic tape cassette in FIG. 6 at completion of attaching operation.

FIG. 6 is a disassembled perspective drawing showing relations between a closing lid unit and a cassette main body of the magnetic tape cassette related to a first embodiment of the present invention; FIG. 7 is a perspective drawing of principle portions showing the assembling procedures of a closing lid unit of the magnetic tape cassette in FIG. 6; FIG. 8 is a sectional drawing of the principle portions showing an attaching operation of an inner lid of the magnetic tape cassette in FIG. 6; FIG. 9 is a sectional drawing of the principle portions showing an attaching operation of a top lid of the magnetic tape cassette in FIG. 6; FIG. 10 is a sectional drawing of the principle portions showing an action of an engagement part during attaching operation of the top lid of the magnetic tape cassette in FIG. 6; and FIG. 11 is a plan of the principle portions showing a state of the top lid of the magnetic tape cassette in FIG. 6 at completion of attaching operation.

A magnetic tape cassette 120 as a first embodiment of the present invention comprises a cassette main body 124 wherein an opening 122 is formed at a front part for insertion of a tape picking element on the side of such an apparatus as a VTR, an upper cassette half 124a and a lower cassette half 124b which constitute such cassette main body 124, a pair of reels 123 and 125 which are disposed inside the lower cassette half 124b so as to revolve freely, a magnetic tape 105 which is wound around both the reels 123 and 125 and is suspended over the opening 122 by a tape guide provided at the front part of the lower cassette half 124b and a closing lid unit 127 which is attached to a front side of the cassette main body 124 so that the magnetic tape 105 suspended over the opening 102 will be covered for such an occasion as portable use. Various components beside the reels 123 and 125 wherearound the magnetic tape 105 is wound are housed between the upper and lower cassette halves 124a and 124b but those housed components are omitted in FIG. 6.

The closing lid unit 127 consists of three lid plates, an outer lid 129, a top lid 130 and an inner lid 131.

The outer lid 129 comprises an outer lid plate 129a which covers a front side of the magnetic tape 105 suspended over the opening 122 and side plate portions 129b which extend from both sides of this outer lid plate 129a. Supporting axle-pins 129c are provided so as to protrude from the inner wall surfaces of the side plate portions 129b, and such supporting axle-pins 129c are fitted in and supported by pin holding holes 132 on both lateral side portions of the upper cassette half 24a at positions close to the front thereof so as to revolve freely. Therefore, the outer lid 129 can revolve with the supporting axle-pins 129c as revolving centers.

The top lid 130 comprises a top lid plate 130a that covers an area above the magnetic tape 105 which is suspended over the opening 122, outer lid linking portions 130b that link both ends of this top lid plate 130a at the front edge side thereof to a top edge of the outer lid plate 129a so as to revolve freely, arm portions 130c that extend from the rear end edge of the top lid plate 130a and top lid slide pins 130d that protrude from the arm portions 130c and that engage with top lid guide grooves 133 which are formed on both the lateral side portions of the upper cassette half 124a so as to slide freely.

In this embodiment, each of the outer lid linking portions 130b has a pin which fits in an engagement hole 129d that is provided in each of both top edge end portions of the outer lid plate 129a.

When the outer lid 129 is opened, this top lid 130 moves to the rear end side of the cassette main body 124 to be approximately parallel to the upper surface of the cassette main body 124 while the top lid slide pins 130d move along the top lid guide grooves 133 according to a revolutionary transfer movement around the supporting axle-pins 129c of the outer lid linking portions 130b.

The inner lid 131, which comprises an inner lid plate 131a that covers a rear side of the magnetic tape 105 which is suspended over the opening 122, top lid linking portions 131b that link a top edge of this inner lid plate 131a to the top lid plate 130a so as to revolve freely and inner lid slide pins 131c that protrude from both ends of a bottom edge of the inner lid plate 131a and that engage with inner lid guide grooves 135 which are formed on inner lateral side portions of the cassette main body 124 so as to slide freely.

In this embodiment, as shown in FIGS. 8 and 9, the top lid linking portions 131b are pins which fit in supporting holes 130f that are provided in supporting pieces 130e which protrude from the top lid plate 130a.

To describe the inner lid 131, when the outer lid 129 is opened, while the top lid linking portions 131b follow the movement of the top lid 130, the inner lid slide pins 131c move along the inner lid guide grooves 135 according to a transfer movement of such top lid linking portions 131b. That is, the inner lid 131 follows the opening action of the top lid 130 and retreats to the area above the opening 122.

When the magnetic tape cassette 120, such as described above, is mounted on a VTR apparatus, the side plate portions 129b of the outer lid 129 are pushed upward by the lid opening pin (not shown) which is provided on the apparatus side and, in accordance with the opening action of the outer lid 129, the top lid 130 and the inner lid 131 are opened. When the magnetic tape cassette 120 is removed from the VTR apparatus, the lids are closed in a manner reverse to that of mounting.

As shown in FIG. 8, the magnetic tape cassette 120 of this embodiment has a structure wherein top ends of the inner lid guide grooves 135 open wide to an upper surface of the cassette main body 124 so that the inner lid slide pins 131c of the inner lid 131 can be fitted in the inner lid guide grooves 135 from the upper side of the cassette main body 124.

As shown in FIGS 6 and 7, slits 140a and 140b are provided at both ends of the top lid plate 130a of the top lid 130 so as to facilitate flexibility of the outer lid linking portions 130b and arm portions 130c to be bent outward.

Additionally in this embodiment, as shown in FIG. 9, a wide entrance 138 which enables the top lid slide pin 130d to fit in the top lid guide groove 133 from the upper side of the cassette main body 124 is configured so as not to be blocked by the side plate part 129b of the outer lid 129.

As shown in FIGS. 7 and 8, since the magnetic tape cassette 120 of this embodiment has a structure wherein the top ends of the inner lid guide grooves 135 open wide to the upper surface of the cassette main body 124, the inner lid slide pins 131c of the inner lid 131 can be fitted in the inner lid guide grooves 135 on the cassette main body 124 side even after the outer lid 129 has been assembled to the cassette main body 124.

As shown in FIG. 9, since the wide entrance 138 which opens the top lid guide 133 to the upper side of the cassette main body 124 is provided, the top lid slide pins 130d of the top lid 130 can be fitted readily in the top lid guide grooves 133 via the wide entrance 138 even after the outer lid 129 has been assembled to the cassette main body 124.

Since the slits 140a and 140b are provided at both the ends of the top lid plate 130a of the top lid 130 so as to facilitate flexibility of the outer lid linking portions 130b and the arm portions 130c to be bent outward, the top lid slide pins 130d can be fitted readily in the top lid guide grooves 133 without utilization of the wide entrance 138 even after the outer lid 129 has been assembled to the cassette main body 124.

As shown in FIG. 10, even after the outer lid 129 has been assembled to the cassette main body 124, if the outer lid linking portions 130b and the arm portions 130c are pushed inward by utilization of the slits 140a and 140b to be deformed outward elastically while the top lid 130 is approximately aligned to the attaching positions from the upper surface side of the cassette main body 124, this respectively enables the outer lid linking portions 130b to be fitted in the engagement holes 129d in top edge end portions of the outer lid plate 129a and also the top lid slide pins 130d which protrude from the arm portions 130c to ride over the square edge portions of the top edge of the cassette main body 124 and to be fitted in the specific top lid guide grooves 33, resulting with such a favorable state of attachment as shown in FIG. 11.

Therefore, the magnetic tape cassette 120 according to the present invention enables attachment of the inner lid 131 and the top lid 130 after completion of the assembly of the outer lid 129 to the upper and lower cassette halves 124a and 124b which constitute the cassette main body 124. Consequently, since the above-described processes of fitting the slide pins of each lid into the guide grooves need not to be carried out at the same time as such operations as positioning of the large number of components housed in the lower cassette half, the assembling operation can be facilitated to achieve higher productivity.

In this embodiment, the slits 140a and 140b are provided respectively at both the ends of the top lid plate 130a of the top lid 130 so as to facilitate the flexibility of the outer lid slide pins 130d and the arm portions 130c; however, the slits 140a and 140b may be provided at either end of the top lid plate 130a of the top lid 130. Since the wide entrances 138 wherewith the top lid guides 133 that are provided on the cassette main body 124 side are made to open to, the upper side of the cassette main body 124 are also provided in this embodiment, the slits 140b which facilitate flexibility of the arm portions 130c in the top lip lid 130 may be omitted. Dimensional factors of the slits described above can be selected appropriately as design items.

In the magnetic tape cassette according to the present invention, the structure wherein the top ends of the inner lid guide grooves open wide to the upper surface of the cassette main body enables the inner lid slide pins of the inner lid to be fitted in the inner lid guide grooves on the cassette main body side even after assembly of the outer lid to the cassette main body.

Additionally, the provision of slits in not less than one end side of the top lid plate of the top lid so as to facilitate flexibility of the outer lid linking portions and arm portions to be bent outward enables the top lid linking portions to be fitted in the specific positions of the outer lid and also enables the top lid slide pins which protrude from the arm portions to ride over the square edge portions of the top edge and to be fitted in the specific top lid guide grooves even after assembly of the cassette main body and the outer lid, if the outer lid linking portions and arm portions are pushed inward by utilization of the slits for outward elastic displacement while the top lid is approximately aligned to the attaching positions from the upper surface side of the cassette main body.

Therefore, the magnetic tape cassette according to the present invention enables attachment of the inner lid and the top lid after completion of the assembly of the outer lid to the upper and lower cassette halves which constitute the cassette main body. Consequently, the above-described processes of fitting the slide pins of each lid into the guide grooves need not to be carried out at the same time as such operations as positioning of the large number of components housed in the lower cassette half, and thus the assembling operation can be facilitated to achieve higher productivity.

A second embodiment according to the present invention will now be described with references to the attached drawings.

Figure 12:
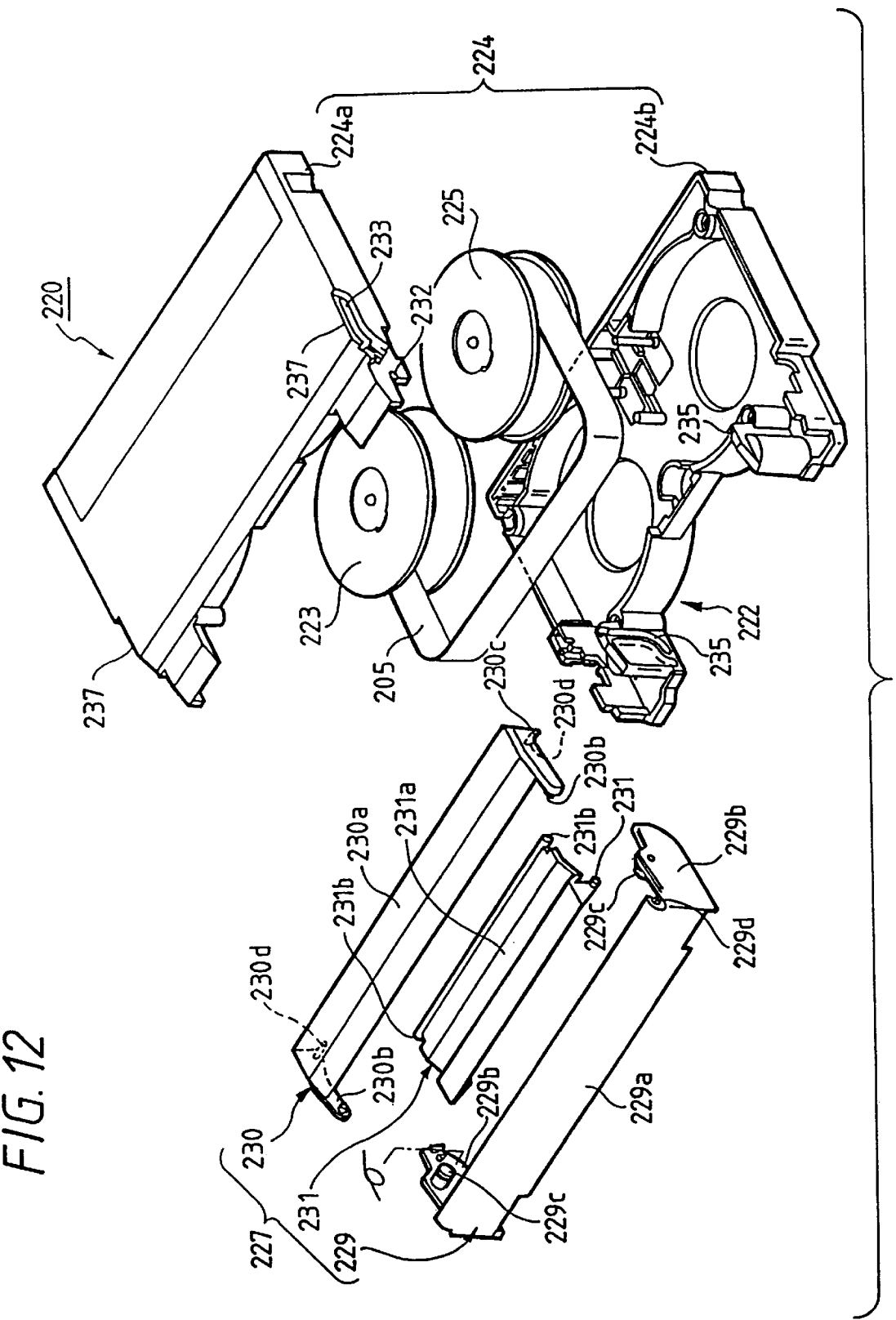
FIG. 12 is a disassembled perspective drawing showing relations between a closing lid unit and a cassette main body of the magnetic tape cassette related to a second embodiment of the present invention.
Figure 13:
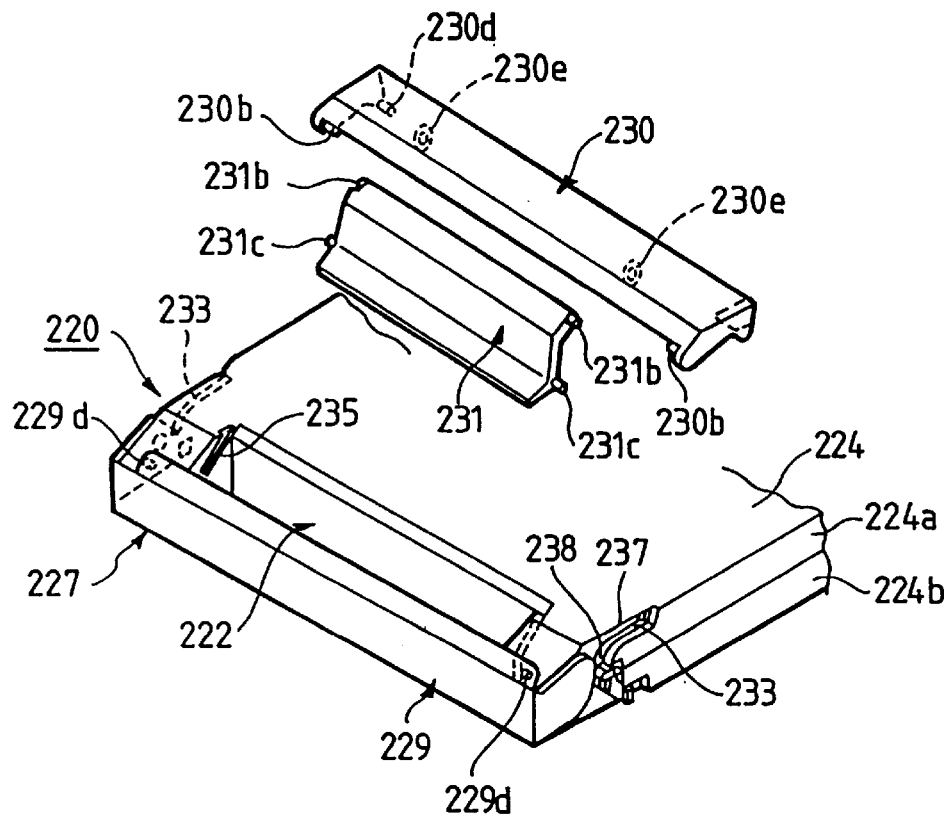
FIG. 13 is a perspective drawing of principle portions showing the assembling procedures of a closing lid unit of the magnetic tape cassette in FIG. 12.
Figure 14:
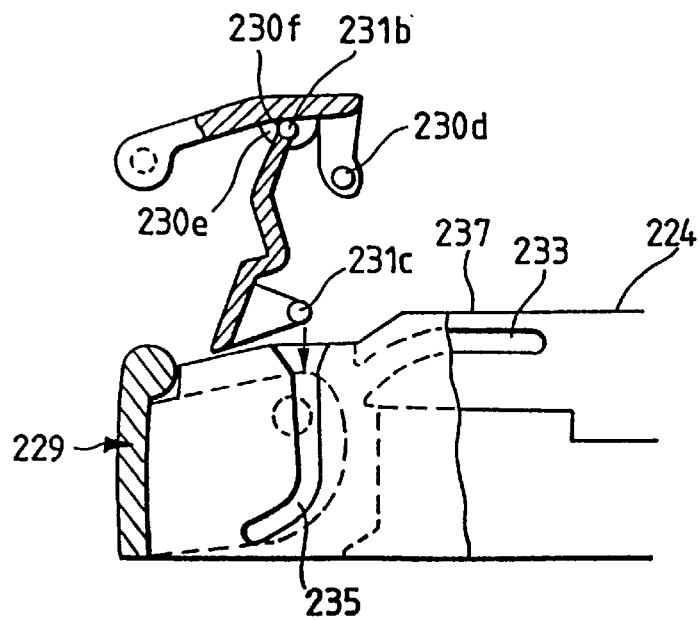
FIG. 14 is a sectional drawing of the principle portions showing an attaching operation of an inner lid of the magnetic tape cassette in FIG. 12.
Figure 15:
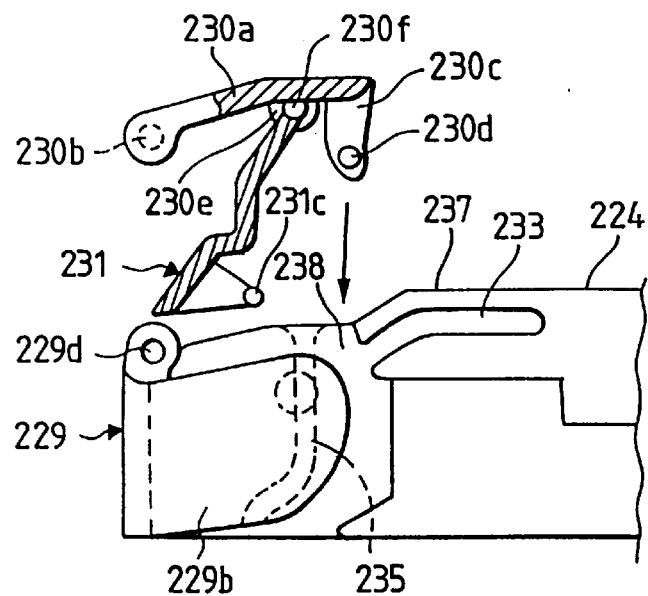
FIG. 15 is a sectional drawing of the principle portions showing an attaching operation of a top lid of the magnetic tape cassette in FIG. 12.
Figure 16:
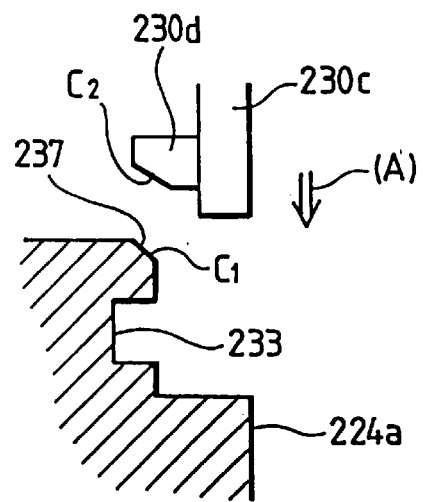
FIG. 16 is a sectional drawing of the principle portions showing an action of an engagement part during attaching operation of the top lid of the magnetic tape cassette in FIG. 12.

FIG. 12 is a disassembled perspective drawing showing relations between a closing lid unit and a cassette main body of the magnetic tape cassette related to a second embodiment of the present invention; FIG. 13 is a perspective drawing of principle portions showing the assembling procedures of a closing lid unit of the magnetic tape cassette in FIG. 12; FIG. 14 is a sectional drawing of the principle portions showing an attaching operation of an inner lid of the magnetic tape cassette in FIG. 12; FIG. 15 is a sectional drawing of the principle portions showing an attaching operation of a top lid of the magnetic tape cassette in FIG. 12; and FIG. 16 is a sectional drawing of the principle portions showing an action of an engagement part during attaching operation of the top lid of the magnetic tape cassette in FIG. 12.

A magnetic tape cassette 220 as an embodiment of the present invention comprises a cassette main body 224 wherein an opening 222 is formed at a front part for insertion of a tape picking element on the side of such an apparatus as a VTR, an upper cassette half 224a and a lower cassette half 224b which constitute such cassette main body 224, a pair of reels 223 and 225 which are disposed inside the lower cassette half 224b so as to revolve freely, a magnetic tape 205 which is wound around both the reels 223 and 225 and is suspended over the opening 222 by a tape guide provided at the front part of the lower cassette half 224b and a closing lid unit 227 which is attached to a front side of the cassette main body 224 so that the magnetic tape 205 suspended over the opening 202 will be covered for such an occasion as portable use. Various components beside the reels 223 and 225 wherearound the magnetic tape 205 is wound are housed between the upper and lower cassette halves 224a and 224b but those housed components are omitted in FIG. 12.

The closing lid unit 227 consists of three lid plates, an outer lid 229, a top lid 230 and an inner lid 231.

The outer lid 229 comprises an outer lid plate 229a which covers a front side of the magnetic tape 205 suspended over the opening 222 and side plate portions 229b which extend from both sides of this outer lid plate 229a. Supporting axle-pins 229c are provided so as to protrude from the inner wall surfaces of the side plate portions 229b, and such supporting axle-pins 229c are fitted in and supported by pin holding holes 232 on both lateral side portions of the upper cassette half 224a at positions close to the front thereof so as to revolve freely. Therefore, the outer lid 229 can revolve with the supporting axle-pins 229c as revolving centers.

The top lid 230 comprises a top lid plate 230a that covers an area above the magnetic tape 205 which is suspended over the opening 222, outer lid linking portions 230b that link both ends of this top lid plate 230a at the front edge side thereof to a top edge of the outer lid plate 229a so as to revolve freely and top lid slide pins 230d that protrude from arm portions 230c which extend from the rear end edge of the top lid plate 230a and that engage with top lid guide grooves 233 which are formed on both the lateral side portions of the upper cassette half 224a so as to slide freely.

In this embodiment, each of the outer lid linking portions 230b has a pin which fits in an engagement hole 229d that is provided in each of both top edge end portions of the outer lid plate 229a.

When the outer lid 229 is opened, this top lid 230 moves to the rear end side of the cassette main body 224 to be approximately parallel to the upper surface of the cassette main body 224 while the top lid slide pins 230d move along the top lid guide grooves 233 according to a revolutionary transfer movement around the supporting axle-pins 229c of the outer lid linking portions 230b.

The inner lid 231, which comprises an inner lid plate 231a that covers a rear side of the magnetic tape 205 which is suspended over the opening 222, top lid linking portions 231b that link a top edge of this inner lid plate 231a to the top lid plate 230a so as to revolve freely and inner lid slide pins 231c that protrude from both ends of a bottom edge of the inner lid plate 231a and that engage with inner lid guide grooves 235 which are formed on inner lateral side portions of the cassette main body 224 so as to slide freely.

In this embodiment, as shown in FIGS. 14 and 15, the top lid linking portions 231b are pins which fit in supporting holes 230f that are provided in supporting pieces 230e which protrude from the top lid plate 230a.

To describe the inner lid 231, when the outer lid 229 is opened, while the top lid linking portions 231b follow the movement of the top lid 230, the inner lid slide pins 231c move along the inner lid guide grooves 235 according to a transfer movement of such top lid linking portions 231b. That is, the inner lid 231 follows the opening action of the top lid 230 and retreats to the area above the opening 222.

When the magnetic tape cassette 2210, such as described above, is mounted on a VTR apparatus, the side plate portions 229b of the outer lid 229 are pushed upward by the lid opening pin (not shown) which is provided on the apparatus side and, corresponding to the opening action of the outer lid 229, the top lid 230 and the inner lid 231 are opened. When the magnetic tape cassette 220 is removed from the VTR apparatus, the lids are closed in a manner reverse to that of mounting.

As shown in FIG. 14, the magnetic tape cassette 220 of this embodiment has a structure wherein top ends of the inner lid guide grooves 235 open wide to an upper surface of the cassette main body 224 so that the inner lid slide pins 231c of the inner lid 231 can be fitted in the inner lid guide grooves 235 from the upper side of the cassette main body 224.

As shown in FIG. 16, edge portions 237 of lateral side top edges of the cassette main body 224, which are disposed over the top lid guide grooves 233, and tips of the top lid slide pins 230d are provided with chamfers C1 and C2. Dimensions of chamfering may be selected appropriately as design items.

Additionally in this embodiment, as shown in FIG. 15, a wide entrance 238 which enables the top lid slide pin 230d to fit in the top lid guide groove 233 from the upper side of the cassette main body 224 is configured so as not to be blocked by the side plate part 229b of the outer lid 229.

As shown in FIGS. 13 and 14, since the magnetic tape cassette 220 of this embodiment has a structure wherein the top ends of the inner lid guide grooves 235 open wide to the upper surface of the cassette main body 224, the inner lid slide pins 231c of the inner lid 231 can be fitted in the inner lid guide grooves 235 on the cassette main body 224 side even after the outer lid 229 has been assembled to the cassette main body 224.

As shown in FIG. 15, since the wide entrance 238 which opens the top lid guide 233 to the upper side of the cassette main body 224 is provided, the top lid slide pins 230d of the top lid 230 can be fitted readily in the top lid guide grooves 233 via the wide entrance 238 even after the outer lid 229 has been assembled to the cassette main body 224.

Since, as shown in FIG. 16, the edge portions 237 of the lateral side top edges of the cassette main body 224, which are disposed over the top lid guide grooves 233, and tips of the top lid slide pins 230d are provided with the chamfers C1 and C2, the top lid slide pins 230d can be fitted readily in the top lid guide grooves 233 without utilization of the wide entrance 238 even after the outer lid 229 has been assembled to the cassette main body 224.

As shown with arrow (A) in FIG. 16, if the top lid slide pins 230d of the top lid 230 are pushed from the upper side of the cassette main body 224 onto the edge portions 237 of the lateral side top edges of the cassette main body 224, which are disposed over the top lid guide grooves 233, the chamfers C1 and C2 are pressed onto each other and thus an action of outward elastic displacement of the top lid. slide pins 230d is generated by a reaction force of pressing, which acts mutually between the chamfered portions. Therefore, the top lid slide pins 230d are enabled to ride over the edge portions 237 of the top edges of the cassette main body 224 and to be fitted in the top lid guide grooves 233.

Therefore, the magnetic tape cassette 220 according to the present invention enables attachment of the inner lid 231 and the top lid 230 after completion of the assembly of the outer lid 229 to the upper and lower cassette halves 224a and 224b which constitute the cassette main body 224.

Consequently, since the above-described processes of fitting the slide pins of each lid into the guide grooves need not to be carried out at the same time as such operations as positioning of the large number of components housed in the lower cassette half, the assembling operation can be facilitated to achieve higher productivity.

In the magnetic tape cassette according to the present invention, the structure wherein the top ends of the inner lid guide grooves open wide to the upper surface of the cassette main body enables the inner lid slide pins of the inner lid to be fitted in the inner lid guide grooves on the cassette main body side even after assembly of the outer lid to the cassette main body.

Additionally, the provision of chamfering at least either at edge portions of lateral side top edges of the cassette main body, which are disposed over the top lid guide grooves, or at tips of the top lid slide pins enables the chamfered portions to be pressed onto each other and thus an action of outward elastic displacement of the top lid slide pins is generated by a reaction force of pressing, which acts mutually between the chamfered surfaces, even after assembly of the cassette main body and the outer lid, if the top lid slide pins of the top lid are pushed from the upper side of the cassette main body onto the edge portions of lateral side top edges of the cassette main body, which are disposed over the top lid guide grooves. Therefore, the top lid slide pins are enabled to ride over the edge portions of the top edges of the cassette main body and to be fitted in the top lid guide grooves.

Therefore, the magnetic tape cassette according to the present invention enables attachment of the inner lid and the top lid after completion of the assembly of the outer lid to the upper and lower cassette halves which constitute the cassette main body. Consequently, the above-described processes of fitting the slide pins of each lid into the guide grooves need not to be carried out at the same time as such operations as positioning of the large number of components housed in the lower cassette half, and thus the assembling operation can be facilitated to achieve higher productivity.

A third embodiment according to the present invention will now be described in detail with references to drawings. However, detailed descriptions of the constituents similar to those of the first or second embodiment of the present invention shown in FIGS. 6–16 are omitted here, so only principle parts of this embodiment will be described hereinafter.

Figure 17:
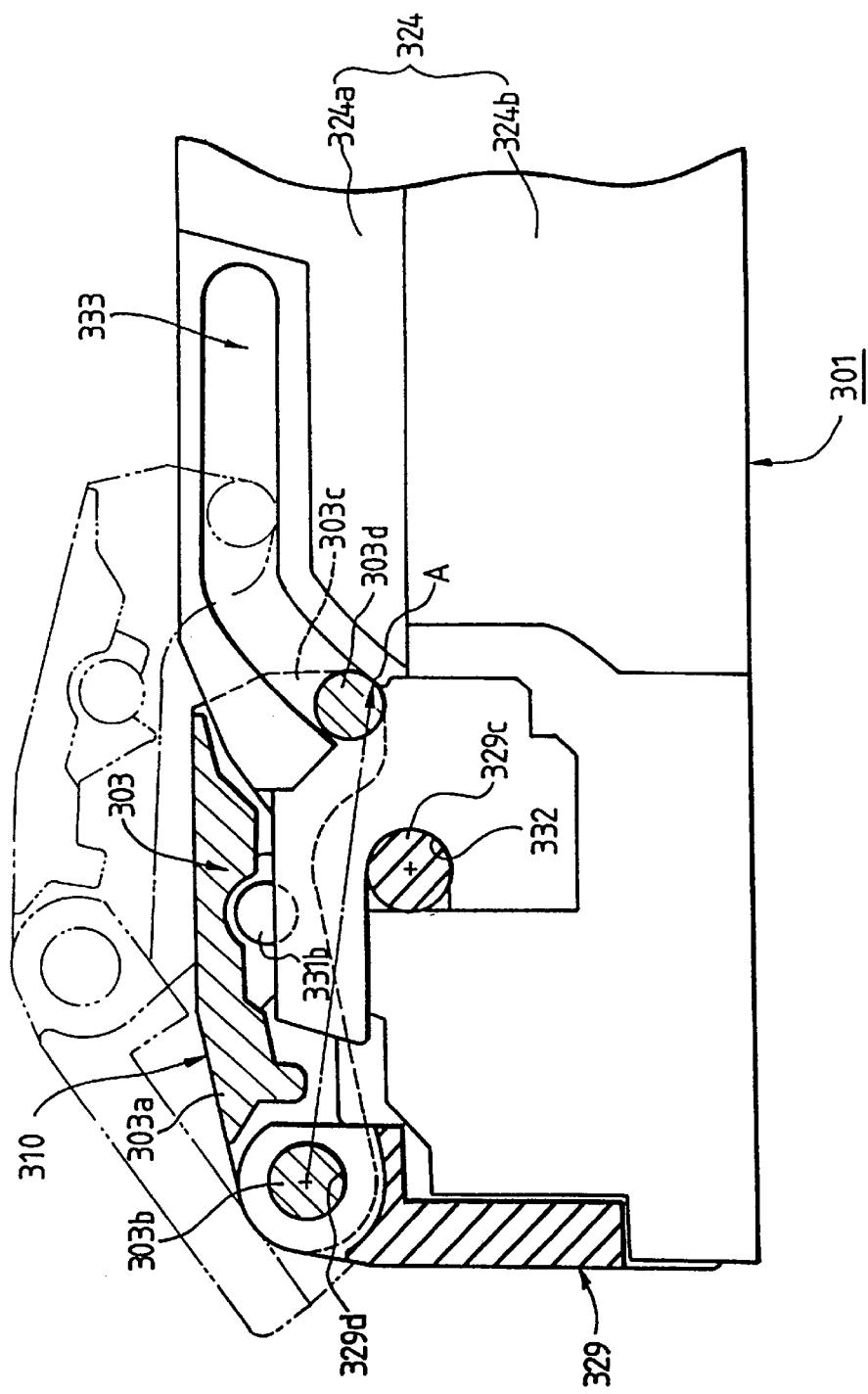
FIG. 17 is a lateral sectional drawing showing a front part structure of a magnetic tape cassette related to a third embodiment according to the present invention.
Figure 18:
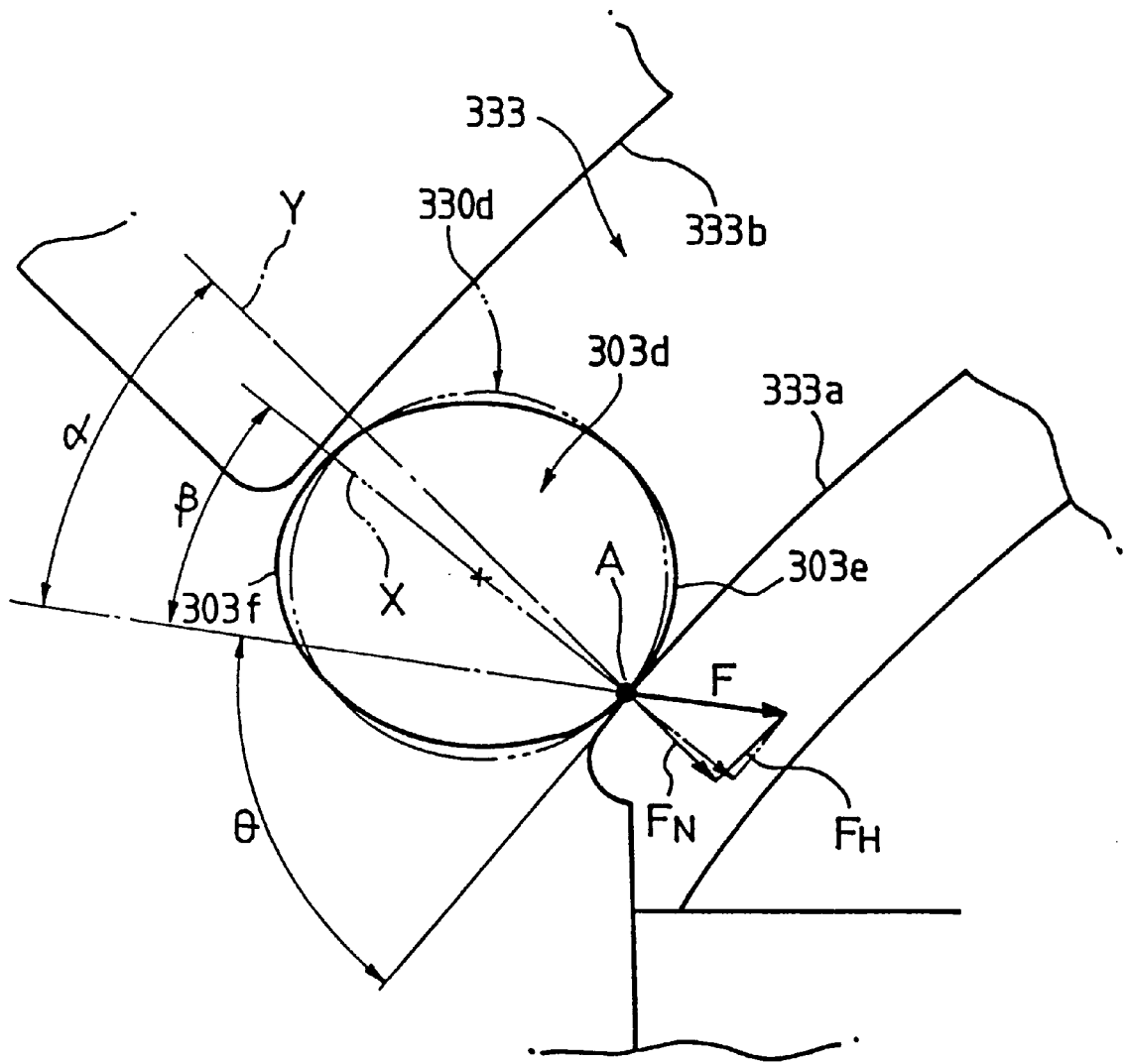
FIG. 18 is a magnified drawing of principle portions of the magnetic tape cassette in FIG. 17.

FIGS. 17 and 18 are a lateral sectional drawing and a magnified drawing of principle portions, showing a front part structure of a magnetic tape cassette 301 related to a third embodiment of the present invention, wherein a closing lid unit 310 which consists of three lid plates, an outer lid 329, a top lid 303 and an inner lid 331, is attached to the front [art of a cassette main body 324 so as to be opened and closed freely.

The outer lid 329 which covers a front side of the magnetic tape 305 (not shown) that is exposed at a front part of the cassette main body 324, wherein supporting axle-pins 329c are fitted in and supported by pin holding holes 332 on both lateral side portions of the upper cassette half 324a at positions close to the front thereof so as to revolve freely, can revolve with such supporting axle-pins 329c as revolving centers.

The top lid 303 comprises a top lid plate 303a that covers an area above the magnetic tape 305, outer lid linking portions 303b that link both ends of this top lid plate 303a at the front edge side thereof to a top edge of the outer lid plate 329a so as to revolve freely, arm portions 303c that extend from the rear end edge of the top lid plate 303a and top lid slide pins 303d that protrude from the arm portions 303c and that engage with top lid guide grooves 333 which are formed on both the lateral side portions of the upper cassette half 324a so as to slide freely. The outer lid linking portions 303b are pins which fit in engagement holes 329d that are provided in both top edge end portions of the outer lid plate 329a.

When the outer lid 329 is opened, this top lid 303 moves to the rear end side of the cassette main body 324 to be approximately parallel to the upper surface of the cassette main body 324 while the top lid slide pins 303d move along the top lid guide grooves 333 according to a revolutionary transfer movement around the supporting axle-pins 329c of the outer lid linking portions 303b.

Additionally in the magnetic tape cassette 301 of the present embodiment, the top lid slide pins 303d of the top lid 303 are configured so as to be in sliding contact via curved surfaces 303e and 303f wherein the portions that are in sliding contact with the sliding surfaces 333a and 333b of the top lid guide grooves 333 have a sectional configuration which is formed by such a free curved line as having a normal that is tilted forward in the direction of the movement if compared with a normal of such sliding surfaces at the contact points.

To describe more specifically, as shown in Figure with two-dots-and-one-dash broken line, although the conventional top lid slide pin 330d has a round section, the top lid slide pin 303d according to the present invention is a pin that has an oval section which comprises the free curved line and which involves a normal Y that is tilted forward in the direction of the movement if compared with a normal X which is defined by the sliding surface 333a and the slide pin 330d that has the conventional round section. In the closing lid unit in the fully closed state as shown in FIGS. 17 and 18, if a lid opening action is started with the side plate portions 329b of the outer lid 329 being pushed upward by a lid opening pin (not shown), the outer lid linking portions 303b of the top lid 303 is also revolved to transfer around the supporting axle-pins 329c.

At this time, a force F of pressure angle θ, which is a force having a certain angle that is definable geometrically, acts from the center of the outer lid linking part 303b against a point A of the sliding surface 333a which the top lid slide pin 303d of the top lid 303 is in contact with, and such force F has an angle a against the normal Y of the top lid slide pin 303d.

Therefore, where an effective perpendicular component at the point A of the sliding surface 333a is defined as $F_N$, static friction coefficient $\mu$ and a force sliding the top lid slide pin 303d in the lid opening direction along the sliding surface 333a as $F_H$, the top lid slide pin 303d slides in the lid opening direction along the sliding surface 333a when $F_H$ is larger than a frictional force $\mu F_N$ which works as sliding resistance.

Thence, where:

$F_H > \mu F_N$, $F_H = F \cdot \sin(\alpha)$, and $F_N = F \cdot \cos(\alpha)$, it is proved that the top lid slide pin 303d slides in the lid opening direction along the sliding surface 333a when $\mu < \tan(\alpha)$.

On the other hand, since the conventional top lid slide pins 330d have a round section, the normal at the contact point of the sliding surface 333a is identical to the normal X of the sliding surface 333a. For this reason, the force F that acts against the point A of the sliding surface 333a which contacts with the top lid slide pin 303d has an angle β against the normal X of the top lid slide pin 330d. Therefore, it is proved that the top lid slide pin 330 slides in the lid opening direction along the sliding surface 333a when $\mu < \tan(\beta)$.

That is, the angle α of the force F against the normal Y of the top lid slide pin 303d in this embodiment is larger than the angle β of the force F against the normal X of the conventional top lid slide pin 330d. Therefore, the effective perpendicular component $F_N = F \cdot \cos(\alpha)$ is smaller than the effective perpendicular component $F_N = F \cdot \cos(\beta)$ where the top lid slide pin 330d which has the conventional round section is utilized. Consequently, the top lid slide pins 303d have a higher smoothness for sliding than the conventional top lid slide pins 330d.

In the present invention, the angle of the related angle α itself may be designed according to the size and material of the slide pins.

As discussed above, since the top lid slide pins 303d are the pins that have the oval section, which is formed so as to be in sliding contact via the curved surface 3e that involves the normal Y which is tilted forward in the direction of the movement if compared with the normal X of the sliding surface 333a, the closing lid unit 310 can be opened smoothly even if the pressure angle θ of the force F is large, wherein the top lid slide pins 303d can be slid more smoothly than the conventional top slide pins 330d that have the round section.

At closing of the closing lid unit 310, the top lid slide pin 303d is in sliding contact with the sliding surface 333b of the guide groove 333, and such top lid slide pin 303d is in sliding contact with such sliding surface 333b via the curved surface 303f that involves the normal which is tilted forward in the direction of the movement if compared with the normal of the sliding surface 333b. Therefore, the top lid slide pins 303d can be slid smoothly in the same way as at the time of lid opening, and the closing lid unit 310 can be opened smoothly.

Although, in the discussion above on the modes of the embodiment, the pin with the oval section have been utilized as an example of the top lid slide pin 303d wherein the sectional configuration has a free curved line, the present invention is not restricted to such as above, but it is sufficient if only the top lid slide pins of the top lid have such a sectional configuration, at least at the portions that are in sliding contact with the sliding surfaces of the top lid guide grooves, as is formed by a free curved line that has a normal which is tilted forward in the direction of the movement if compared with a normal of such sliding surfaces at the contact points, and the free curved line is not restricted to such curved line as follows the circumferential surface of the pin which has the oval section but available in various formes of curved lines. It should be clearly understood that the configurations of the top lid slide pins at the portions not in sliding contact with the sliding surface of the top lid guide grooves are available in any form.

In the magnetic tape cassette according to the present invention, since the top lid slide pins of the top lid are configured so as to be in sliding contact via curved surfaces wherein the portions that are in sliding contact with the sliding surfaces of the top lid guide grooves have a sectional configuration which is formed by such a free curved line as having a normal that is tilted forward in the direction of the movement if compared with a normal of such sliding surfaces at the contact points and, even if the pressure angle of the force that acts between the outer lid linking portions and the top lid guide grooves via the slide pins is large, such top lid slide pins are enabled to slide smoothly; thus a favorable magnetic tape cassette wherein a closing lid unit can be opened and closed smoothly can be provided.

Fourth, fifth and sixth Embodiments which are video cassettes as applications of the magnetic tape cassette related to a third aspect of the present invention will now be described in detail with references to FIG. 19 through 23.

Figure 19:
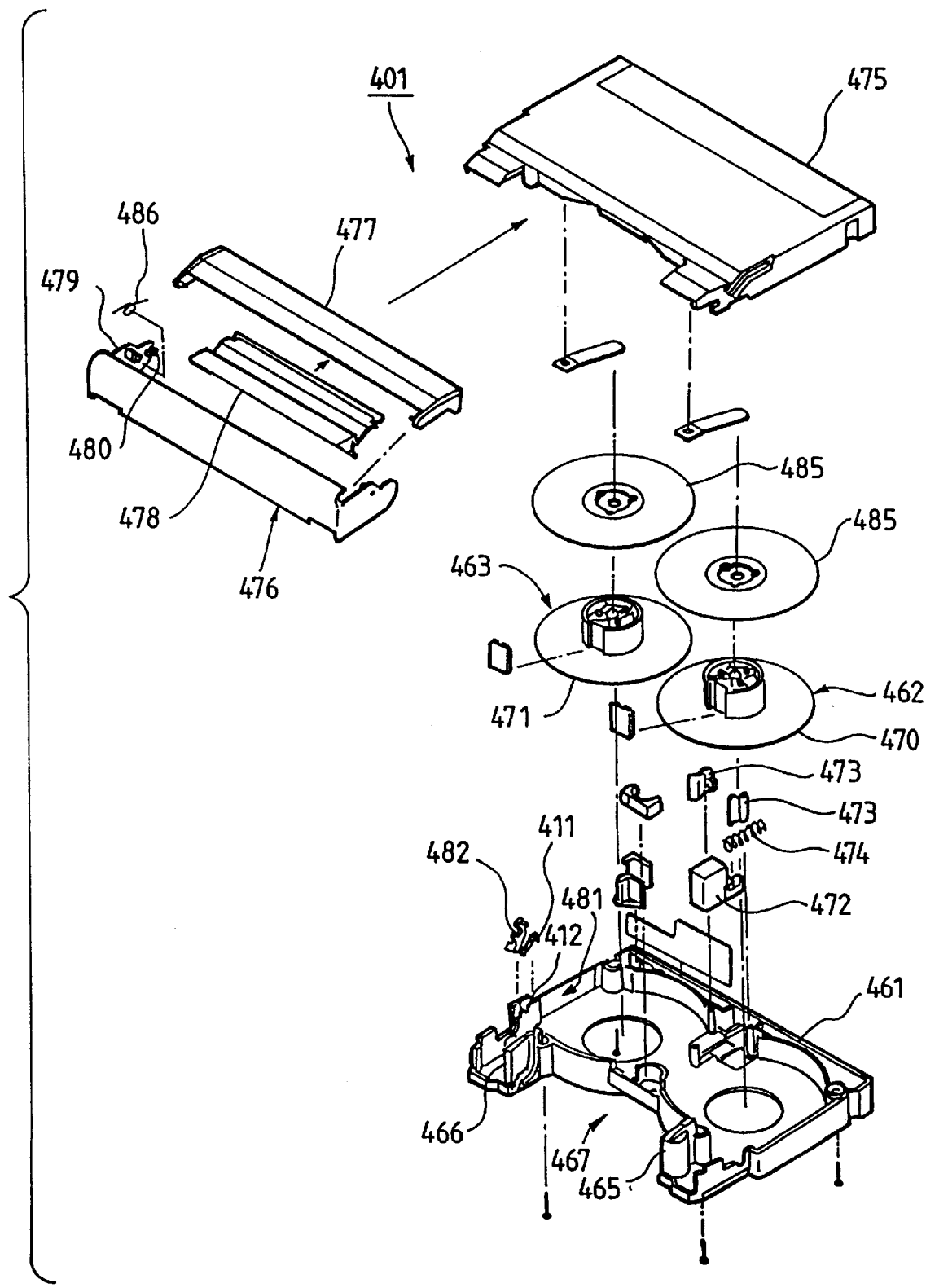
FIG. 19 is a disassembled perspective drawing showing a video tape cassette as an application of the magnetic tape cassette related to embodiments of the present invention.

FIG. 19 is a disassembled perspective drawing showing a video tape cassette 401 of a fourth embodiment as an application of the magnetic tape cassette related to the present invention.

Figure 1:
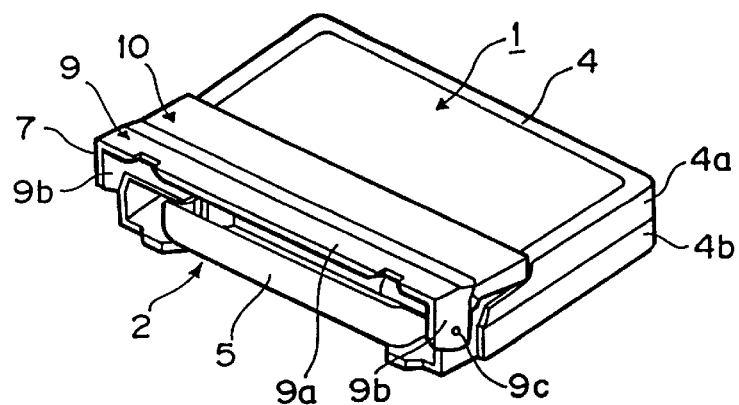
FIG. 1 is a drawing showing a perspective view of a conventional three-lid type magnetic tape cassette in an assembled state.
Figure 2:
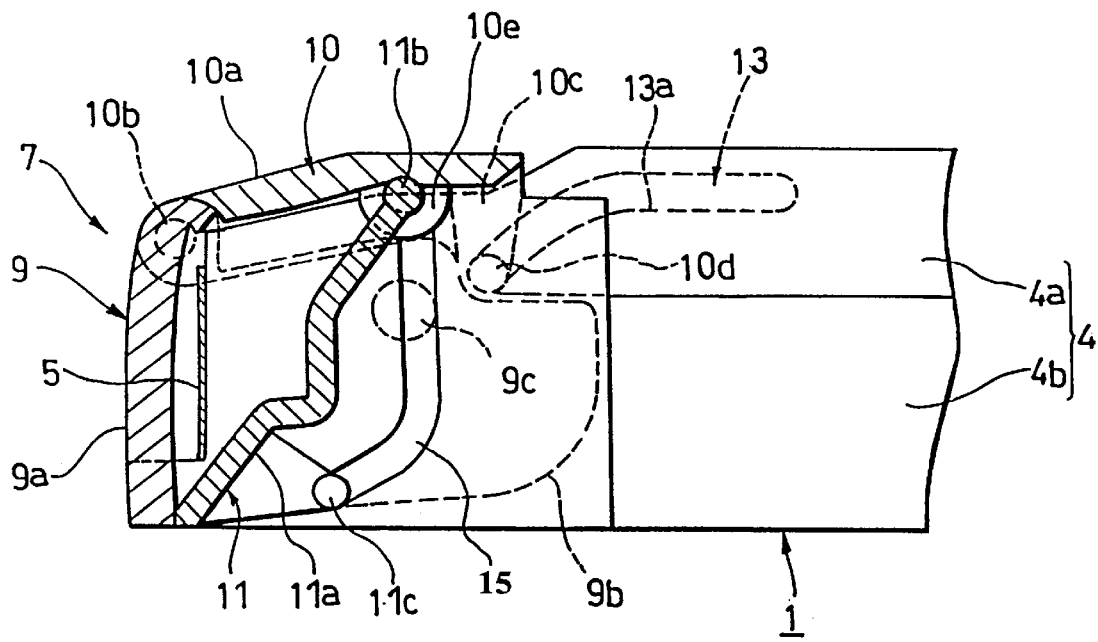
FIG. 2 is a sectional view of principle portions showing the magnetic tape cassette in FIG. 1 in a state wherein the lid is closed.
Figure 3:
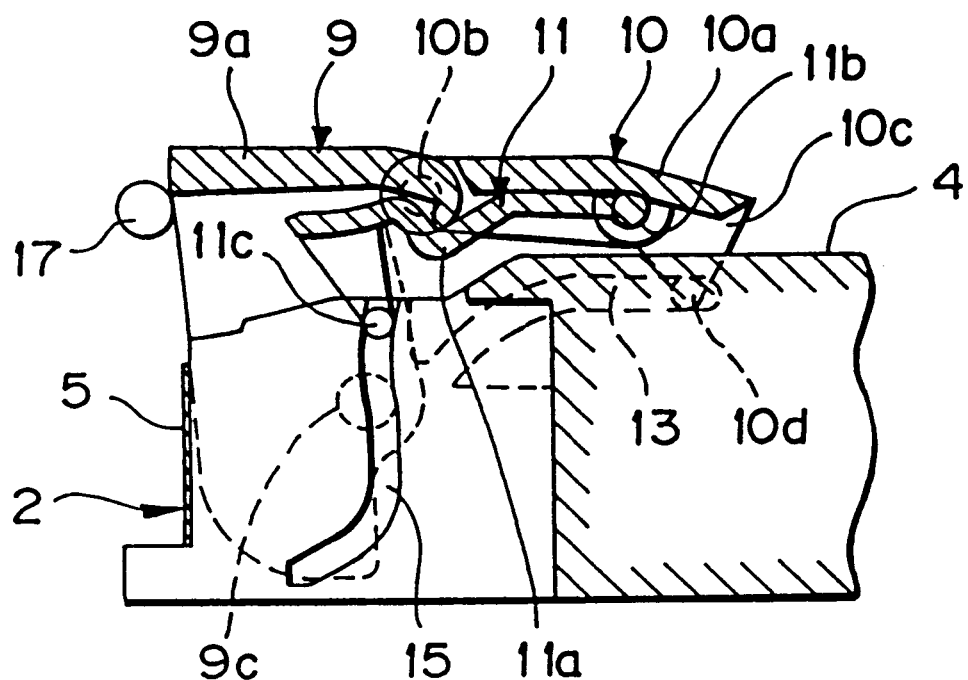
FIG. 3 is a sectional view of principle portions showing the magnetic tape cassette in FIG. 1 in a state wherein the lid is open.
Figure 4:
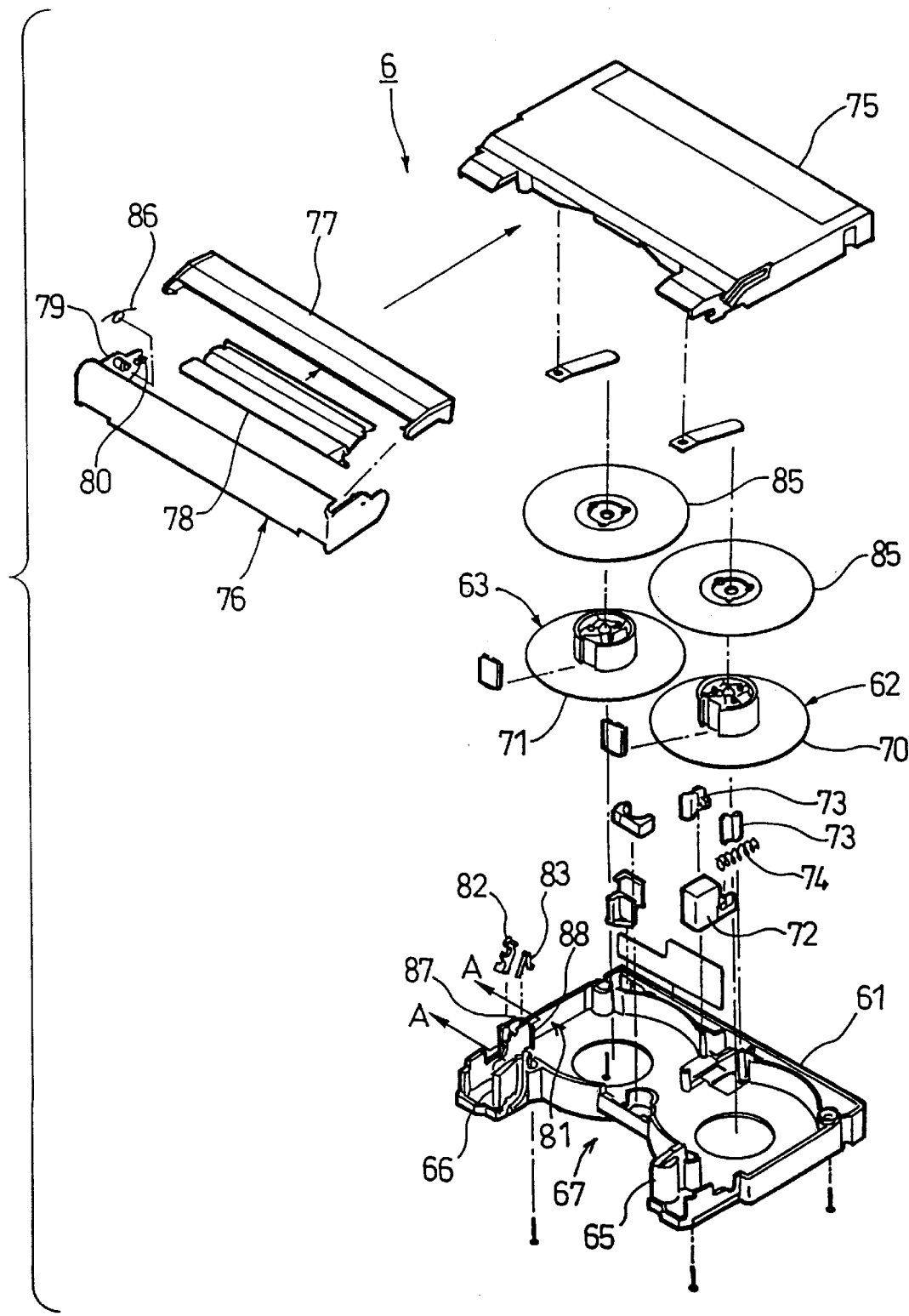
FIG. 4 is a disassembled perspective drawing showing a conventional video cassette tape.

The video tape cassette 401 is approximately the same as the conventional video tape cassette 406 (FIG. 4) and portions which are the same as the conventional ones are given the same symbols. It should be noted that, as shown in FIG. 420 (a view at a position along section A—A in the direction of the arrows in FIG. 19), the video tape cassette 401 is different from the conventional one in that a leaf spring 411 which is bent into a U shape at the attachment base part 423 so that the entire figure will have a shape of a hook is utilizes as a lid lock spring and in that a lateral side wall part 412 is provided on a lateral side plate 481 of the lower half 461 so that the leaf spring 411 can be pressed onto for insertion thereof.

Figure 20:
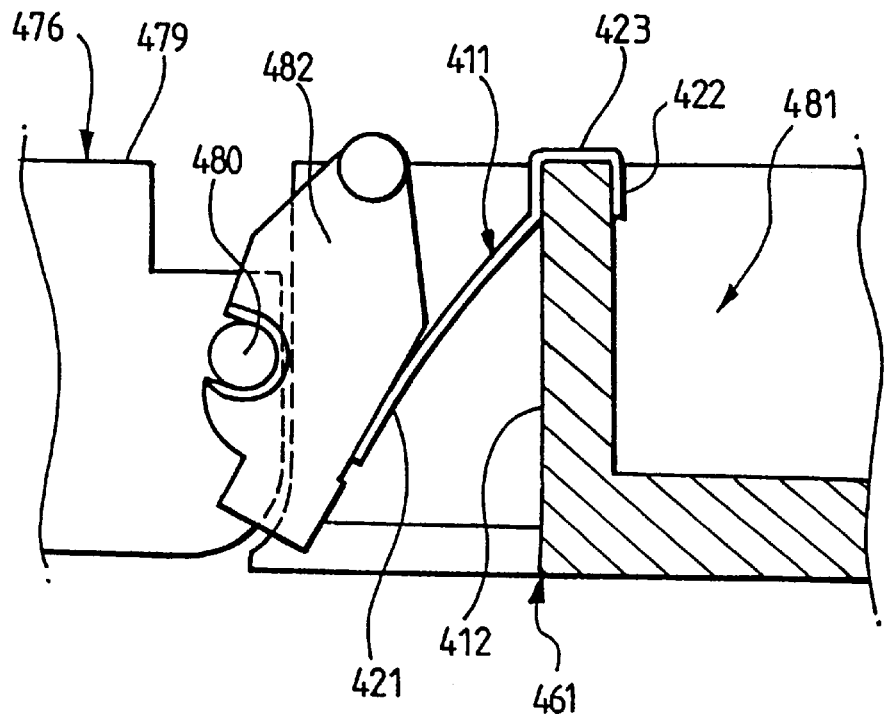
FIG. 20 is a perspective drawing showing principle portions of a magnetic tape cassette related to a fourth embodiment of the present invention.

The leaf spring 411 has the shape of such a hook as shown in FIG. 20, and is constituted by a free end 421 for applying force to a lid lock 482, an end 422 opposite to the free end 421 and the U shaped base part (holder part) 423 which is pressed onto for insertion of the lateral side wall part 412. The lateral side wall part 412 may have the same height as other side walls or a height slightly different from other lateral side walls.

Figure 21:
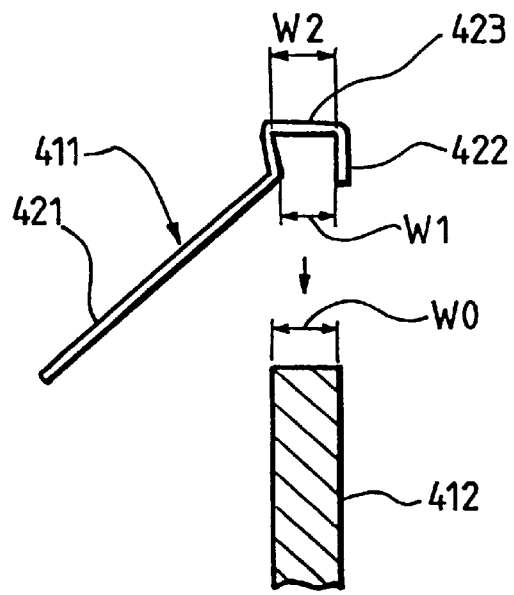
FIG. 21 is a simplified drawing showing relations between a leaf spring and a lateral side wall in FIG. 20.

As shown in FIG. 21, a width W1 of the base part 423 of the leaf spring 411 on the insertion entrance side (a width W2 on the rear side is wider than the width W1 on the insertion entrance side) is slightly narrower than a width W0 of the lateral side wall part 412. This allows the base part 423 to be pressed onto for insertion of the lateral side wall part 412 and prevents the leaf spring 411 from being disengaged from the lateral side wall part 412 inadvertently.

Figure 5:
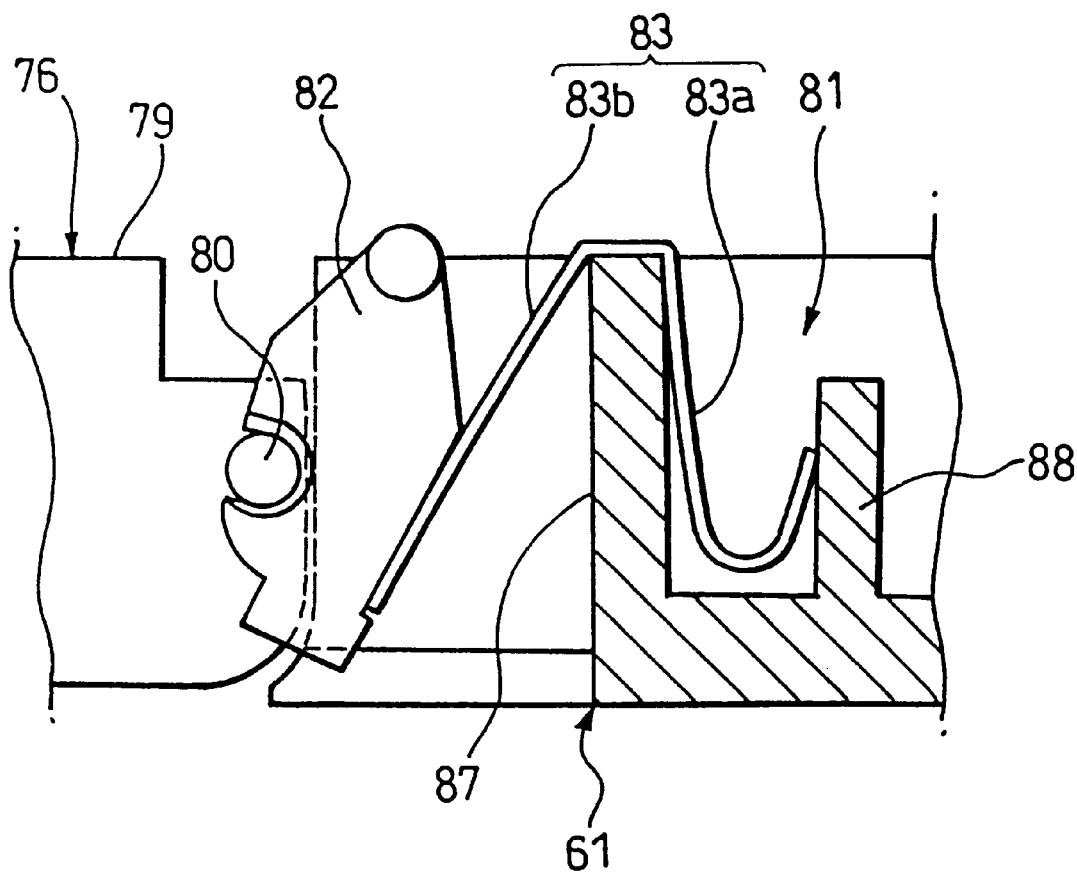
FIG. 5 is a sectional drawing of a part along line A—A in FIG. 4.

As described above, the magnetic tape cassette 401 utilizes the approximately-hook-shaped leaf spring 411 as the lid lock spring and the U shaped base part 423 of the leaf spring 411 is pressed onto for insertion of the lateral side wall part 412; therefore, the configuration of the leaf spring 411 has been simplified if compared with the conventional one and a rib (rib 88 in FIG. 5) needs not to be provided besides the lateral side wall part 412.

Consequently, the structure in the vicinity of the lateral side wall part 412 is simplified and thus the metal mold for forming the cassette half is simplified; this results with prevention of shrink marks in the area for attachment of the leaf spring 411 and thus the forming accuracy can be improved.

Figure 22:
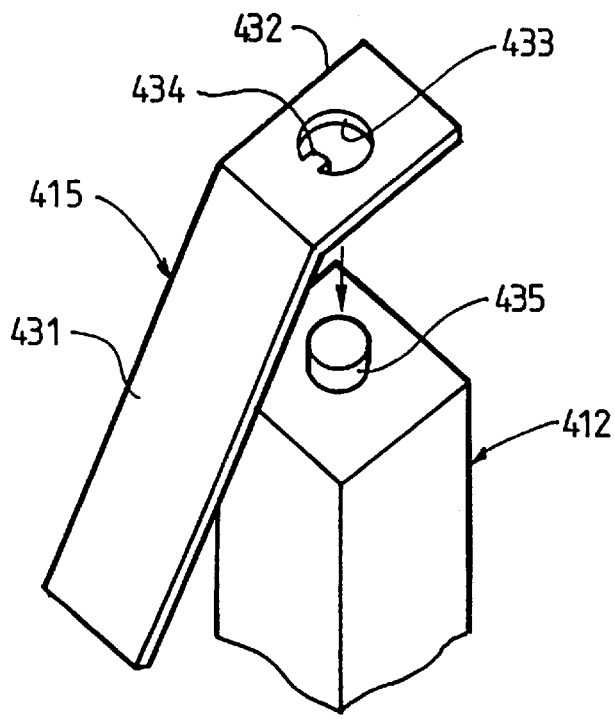
FIG. 22 is a perspective drawing showing principle portions of a magnetic tape cassette related to a fifth embodiment of the present invention.

FIG. 22 shows a leaf spring 415 and the lateral side wall part 412 of a fifth embodiment. The leaf spring 415 is formed to have a dull-angle bent constituted with a free end 431 and a base part 432. The base part 432 has a round hole 433 and a projection 434 is provided inside the round hole 433. On the other hand, a projection 435 which has a diameter slightly smaller than that of the round hole 433 is provided on the top surface of the lateral side wall part 412.

In this case, when the round hole 433 of the leaf spring 415 is pressed onto for insertion of the projection 435 of the lateral side wall part 412, the projection 434 is deformed so that the projection 434 is engaged with the projection 435 while thrusting into with the elastic restitution power thereof, and thus the leaf spring 415 is locked.

This secures the attachment of the leaf spring 415 and prevents inadvertent disengagement during assembling operation. The leaf spring 415 has a much simplified configuration.

Figure 23:
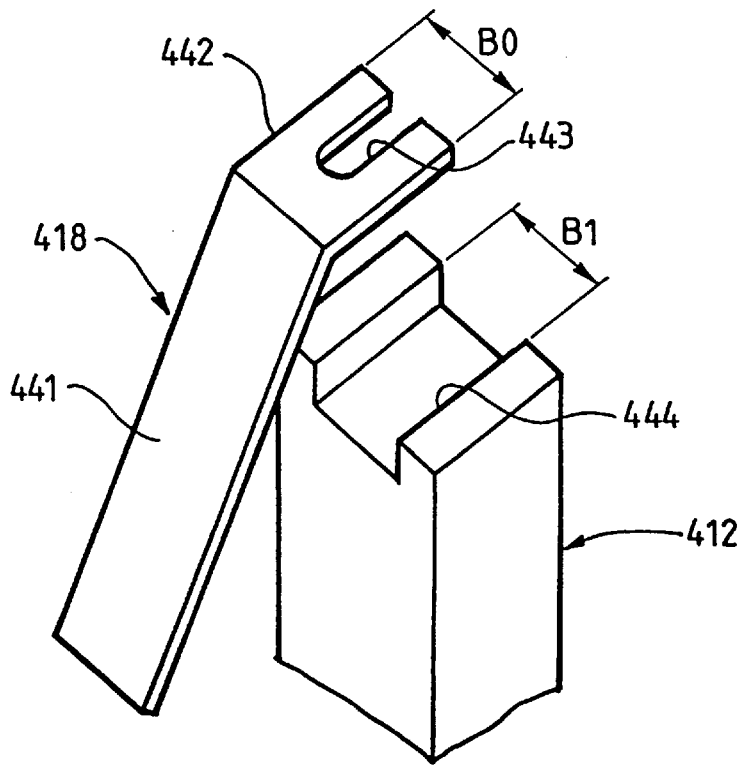
FIG. 23 is a perspective drawing showing principle portions of a magnetic tape cassette related to a sixth embodiment of the present invention.

FIG. 23 shows a leaf spring 418 and the lateral side wall part 412 of a sixth embodiment. The leaf spring 418 is formed to have a dull-angle bent constituted with a free end 441 and a base part 442. The base part 432 has a slit 443 of an appropriate width B0. This allows the base part 442 to deform elastically in a widthwise direction.

On the other hand, a groove 435 of a width B1 which is slightly narrower than the width B0 of the base part 442 is provided on the top surface of the lateral side wall part 412.

In this case, when the base part 442 of the leaf spring 401 is pushed into the groove 444 of the lateral side wall part 412, the base part 442 is shrunk elastically and is engaged with the groove 444 by the elastic restitution power thereof. This secures the attachment. The leaf spring 418 is also compact with the base part 442 and the entire configuration is also simplified; therefore, the processing is also simple and highly efficient at handling.

As described above, in the magnetic tape cassette according to the present invention, since the configuration of the leaf spring which is the lid lock spring can be simplified in the attachment structure, simplification of the structure of the metal mold enables improvement in the forming accuracy and thus in the effectiveness of the spring attachment and also enables provision of magnetic tape cassettes of high efficiency in the assembling process. This invention also enables cost reduction through reduction in the size and configuration of the leaf spring.

Furthermore, the present invention enables automatic assembling through ensured attachment of the leaf spring.

Note that although the first to sixth embodiments are independently explained each another in the specification, it is possible to modify or combine two or more embodiments.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic tape cassette including,
a cassette main body (124) having an opening (122) at a front part, top lid guide grooves (133) formed on both lateral side portions of said cassette main body, and inner lid guide grooves (135) formed on inner lateral side portions of the cassette main body,
a pair of reels (123, 125) disposed inside said cassette main body and attached so as to be rotatable with a magnetic tape (105) wound therearound, and
a lid unit (127) for covering said opening,
wherein said lid unit (127) comprises:
an outer lid (129) including
an outer lid plate (129*a*) that covers a front side of said magnetic tape (105) that is suspended over said opening,
side plate portions (129*b*) extending from both sides of said front lid plate (129*a*) and being rotatably supported by both lateral side portions of said cassette main body, and
pins (129*c*) protruded from the inner wall surfaces of said side plate portions (129*b*) and rotatably fitted on both lateral side portions of said cassette main body in such a manner that said outer lid (129) is rotatable with respect to said cassette main body about said pins;
a top lid (130) including
a top lid plate (130*a*) covering an area above said magnetic tape which is suspended over said opening, said top lid plate (130*a*) being provided with arm portions (130*c*) which extended from both ends of said top lid plate,
outer lid linking portions (130*b*) rotatably engaging both ends of said top lid plate at the front edge side thereof to a top edge of said outer lid plate, and
top lid slide pins (130*d*) protruded from said arm portions (130*c*) and engaged with said top lid guide grooves (133) of said cassette main body (124) so as to be slidable relative to said cassette main body; and
an inner lid (131) including,
an inner lid plate (131*a*) covering a rear side of said magnetic tape which is suspended over said opening,
top lid linking portions (131*b*) engaging a top edge of said inner lid plate (131*a*) with said top lid plate (130*a*) so as to be rotatable relative to each other, and inner lid slide pins (131c) protruded from both ends of a bottom edge of said inner lid plate (131a) and engaged with said inner lid guide grooves (135) so as to be slidable relative to said cassette main body;

wherein top ends of said inner lid guide grooves (135) are opened to an upper surface of the cassette main body so as to enable insertion of said inner lid slide pins (131c) of said inner lid (131) into said inner lid guide grooves (135) from the upper side of said cassette main body, and a slit member (140a or 140b) is provided at at least one of said ends of said top lid plate (130a) of said top lid (130) so as to provide flexibility of a portion of said top lid plate to be bent outwardly when said magnetic tape cassette is assembled.

2. The magnetic tape cassette according to claim 1, in which said slit member (140a or 140b) comprises at least one of a first slit (140a) which is provided at said end of said top lid plate (130a) of said top lid (130) so as to provide flexibility of said arm portions (130d) and a second slit (140b) which is provided at said end of said top lid plate (130a) of said top lid (130) so as to provide flexibility of said outer lid linking portions (130b).

3. The magnetic tape cassette according to claim 1, in which said slit member (140a or 140b) comprises both of said first slit (140a) and said second slit (140b).

* * * * *